United States Patent
Hayama

(10) Patent No.: US 12,313,416 B2
(45) Date of Patent: May 27, 2025

(54) TRAVEL PLAN GENERATING METHOD AND TRAVEL PLAN GENERATING SYSTEM FOR MOBILE VEHICLES BASED ON REMAINING ENERGY

(71) Applicant: Panasonic Intellectual Property Management Co., Ltd., Osaka (JP)

(72) Inventor: Satoru Hayama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/639,106

(22) Filed: Apr. 18, 2024

(65) Prior Publication Data

US 2024/0263953 A1 Aug. 8, 2024

Related U.S. Application Data

(63) Continuation of application No. 17/224,485, filed on Apr. 7, 2021, now Pat. No. 11,988,516, which is a (Continued)

(30) Foreign Application Priority Data

Mar. 15, 2019 (JP) .................................. 2019-049061

(51) Int. Cl.
   *G01C 21/34* (2006.01)
   *G06Q 10/0835* (2023.01)
   *B60L 58/13* (2019.01)

(52) U.S. Cl.
   CPC ... *G01C 21/3469* (2013.01); *G06Q 10/08355* (2013.01); *B60L 58/13* (2019.02)

(58) Field of Classification Search
   CPC .......... G01C 21/3469; G06Q 10/08355; B60L 58/13
   See application file for complete search history.

(56) References Cited

U.S. PATENT DOCUMENTS 9,397,518 B1 * 7/2016 Theobald .................. B25J 5/005
9,429,951 B2 * 8/2016 Kazama ............... G05D 1/0274
(Continued)

FOREIGN PATENT DOCUMENTS

| JP | 2011-153892 | 8/2011 |
| JP | 2012-73979 | 4/2012 |

(Continued)

OTHER PUBLICATIONS

International Search Report issued Feb. 18, 2020 in International (PCT) Application No. PCT/JP2019/046119.
(Continued)

*Primary Examiner* — Ramsey Refai
(74) *Attorney, Agent, or Firm* — Wenderoth, Lind & Ponack, L.L.P.

(57) ABSTRACT

A delivery plan generating method includes determining a start point that is point where delivery of a delivery object starts, determining an end point where the delivery of the delivery object finishes, determining a transfer point as a destination with reference to the start point, the end point, a position of the first mobile unit, and a position of the second mobile unit, the transfer point being a point where the delivery object is transferred from the first mobile unit to the second mobile unit, and generating a delivery plan for causing the first mobile unit to travel via the start point to the determined transfer point and causing the second mobile unit to travel via the determined transfer point to the end point.

9 Claims, 13 Drawing Sheets

Related U.S. Application Data continuation of application No. PCT/JP2019/046119, filed on Nov. 26, 2019.

(56) References Cited

U.S. PATENT DOCUMENTS

| | | | |
|---|---|---|---|
| 9,494,937 B2* | 11/2016 | Siegel | G05D 1/104 |
| 10,549,915 B1* | 2/2020 | Theobald | B65G 1/1375 |
| 2010/0174436 A1* | 7/2010 | Matsunaga | G05D 1/0212 |
| | | | 701/26 |
| 2015/0370251 A1 | 12/2015 | Siegel et al. | |
| 2016/0026186 A1* | 1/2016 | Kazama | B65G 1/137 |
| | | | 701/24 |
| 2017/0364074 A1* | 12/2017 | Lau | G05D 1/0088 |
| 2018/0349834 A1* | 12/2018 | Heinla | G06Q 10/08 |

FOREIGN PATENT DOCUMENTS

| | | |
|---|---|---|
| JP | 2013-34323 | 2/2013 |
| JP | 2015-65761 | 4/2015 |
| JP | 2015-079453 A | 4/2015 |
| JP | 2017-182772 | 10/2017 |
| JP | 6257318 | 1/2018 |
| WO | 2015/059739 | 4/2015 |

OTHER PUBLICATIONS

Extended European Search Report issued Feb. 25, 2022 in corresponding European Patent Application No. 19920227.6.

* cited by examiner

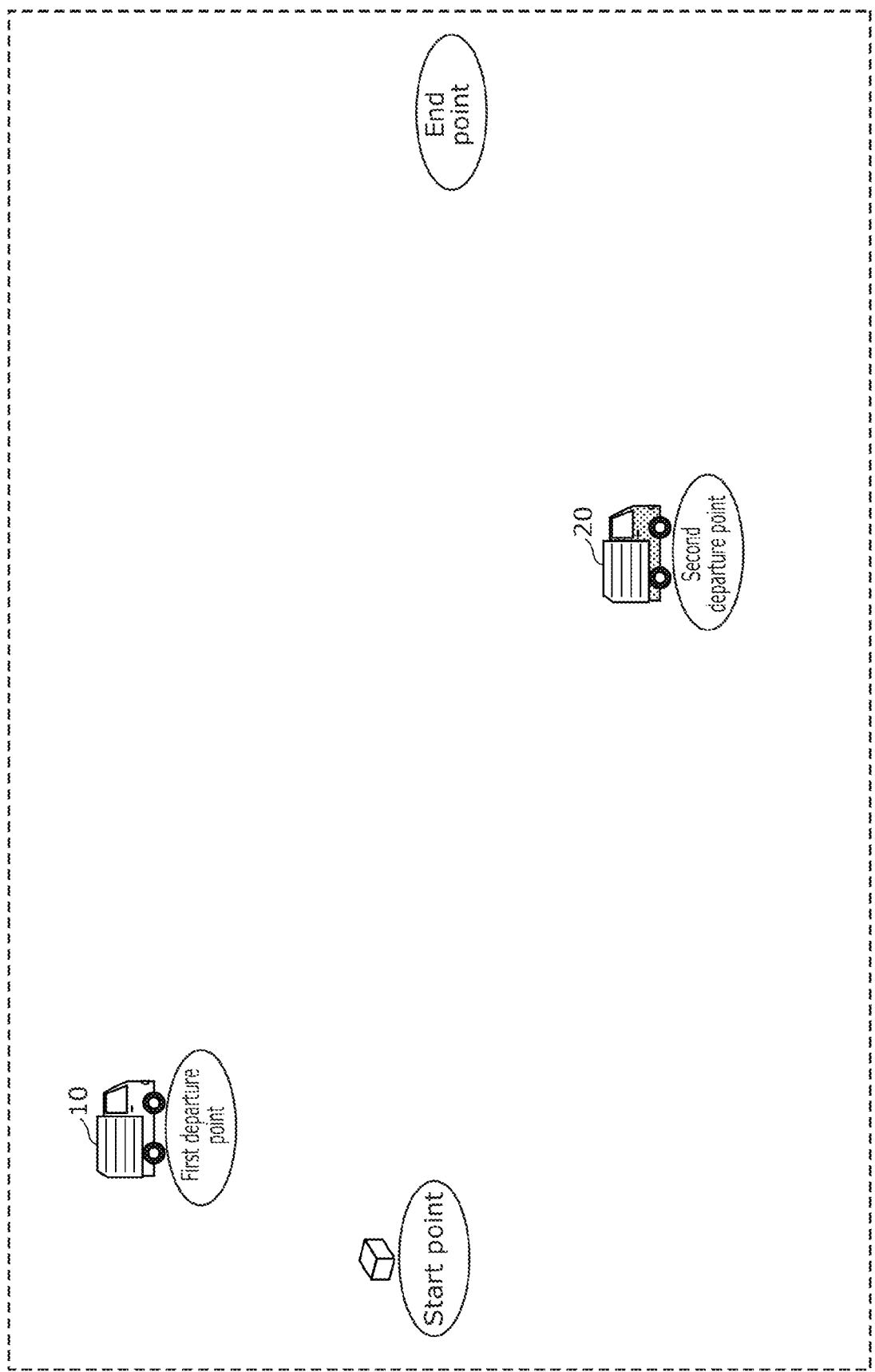

TRAVEL PLAN GENERATING METHOD AND TRAVEL PLAN GENERATING SYSTEM FOR MOBILE VEHICLES BASED ON REMAINING ENERGY

CROSS REFERENCE TO RELATED APPLICATIONS

This application is a continuation of U.S. application Ser. No. 17/224,485 filed Apr. 7, 2021, which is a continuation application of PCT International Application No. PCT/JP2019/046119 filed on Nov. 26, 2019, designating the United States of America, which is based on and claims priority of Japanese Patent Application No. 2019-049061 filed on Mar. 15, 2019. The entire disclosures of the above-identified applications, including the specifications, drawings and claims are incorporated herein by reference in their entirety.

FIELD

The present disclosure relates to a delivery plan generating method and the like for generating a delivery plan for mobile units.

BACKGROUND

A technique has conventionally been disclosed in which, in order to avoid a situation where electric vehicles (EVs) run out of charge during delivery of delivery objects, a control center or the like extracts vehicles that have enough remaining charge to travel from their current position via a riding position and a destination to the nearest charging station, and notifies a vehicle that is located closest to the riding position, among the extracted vehicles, of a delivery instruction (e.g., see PTL 1).

Another technique has also conventionally been disclosed in which, in order for an EV that has or is about to travel out of charge during delivery of delivery objects to transfer the delivery to another vehicle, a server or the like acquires information indicating that a first vehicle is incapable of traveling or is highly likely to become incapable of traveling, then sets a point of liaison with a second vehicle at the current position of the first vehicle or at a location between the current position of the first vehicle and a destination, and instructs the first and second vehicles to have a liaison with each other at the point of liaison (e.g., see PTL 2).

CITATION LIST

Patent Literature

PTL 1: Japanese Unexamined Patent Application Publication 2012-073979
PTL 2: Japanese Patent No. 6257318

SUMMARY

Technical Problem

The configuration disclosed in PTL 1, however, has a problem in that delivery cannot be completed if the delivery distance is too long to travel for a single vehicle that is even in a fully charged condition.

The configuration disclosed in PTL 2 also has a problem in that, when the first vehicle has or is about to travel out of charge, the point of liaison is set at the current position of the first vehicle or at a position between the current position of the first vehicle and the destination without any consideration given to the circumstances of the second vehicle. This may result in the second vehicle failing to arrive at the point of liaison or the destination or travelling inefficiently after the liaison.

The present disclosure has been made in order to solve the conventional problems described above, and it is an object of the present disclosure to provide a delivery plan generating method and the like that can reduce the possibility that delivery of delivery objects will end in failure due to depletion of moving energy of mobile units.

Solution to Problem

A delivery plan generating method according to one aspect of the present disclosure is a delivery plan generating method to be executed by a computer. The method includes determining a start point, the start point being either a point where delivery of a delivery object starts or a point where a first mobile unit that is delivering the delivery object is located, determining an end point, the end point being either a point where the delivery of the delivery object finishes or a point where a second mobile unit that takes over the delivery object from the first mobile unit finishes the delivery of the delivery object, determining a transfer point as a destination with reference to the start point, the end point, a position of the first mobile unit, and a position of the second mobile unit, the transfer point being a point where the delivery object is transferred from the first mobile unit to the second mobile unit, and generating a delivery plan for causing the first mobile unit to travel via the start point to the transfer point determined and causing the second mobile unit to travel via the transfer point determined to the end point.

Advantageous Effects

According to the present disclosure, it is possible to provide a delivery plan generating method and the like that can reduce the possibility that the delivery of delivery objects will end in failure due to depletion of moving energy of mobile units.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4A is a diagram for describing a flow of processing until execution of the delivery plan is completed.

DESCRIPTION OF EMBODIMENTS

Figure 1:
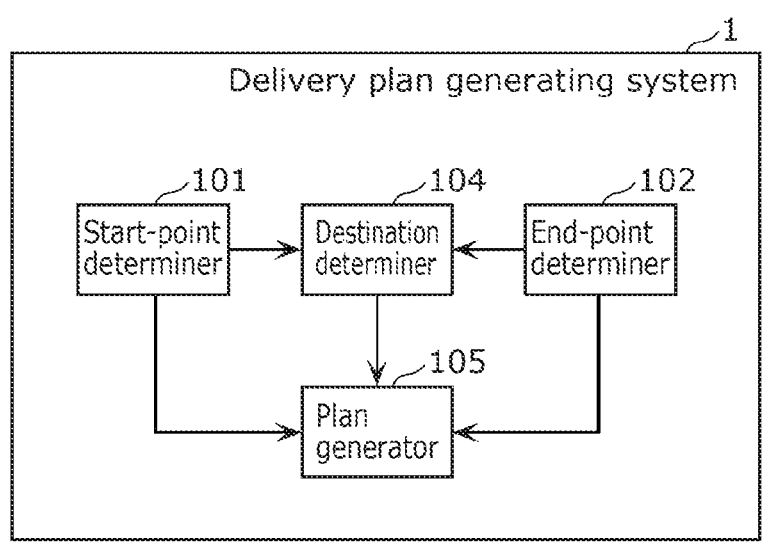
FIG. 1 is a diagram illustrating an overall configuration of a delivery plan generating system according to Embodiment 1.

A delivery plan generating method according to one aspect of the present disclosure is a delivery plan generating method to be executed by a computer. The method includes determining a start point, the start point being either a point where delivery of a delivery object starts or a point where a first mobile unit that is delivering the delivery object is located, determining an end point, the end point being either a point where the delivery of the delivery object finishes or a point where a second mobile unit that takes over the delivery object from the first mobile unit finishes the delivery of the delivery object, determining a transfer point as a destination with reference to the start point, the end point, a position of the first mobile unit, and a position of the second mobile unit, the transfer point being a point where the delivery object is transferred from the first mobile unit to the second mobile unit, and generating a delivery plan for causing the first mobile unit to travel via the start point to the transfer point determined and causing the second mobile unit to travel via the transfer point determined to the end point.

According to this configuration, even if the delivery distance is too long to move (e.g., to travel, when the mobile unit is a vehicle) for a single mobile unit that is even in a fully charged condition, it is possible to complete the delivery because the delivery object is transferred from the first mobile unit to the second mobile unit during the delivery. The transfer point where the delivery object is transferred from the first mobile unit to the second mobile unit is determined based on not only the start point, the end point, and the position of the first mobile unit but also the position of the second mobile unit, i.e., the circumstances of the second mobile unit are taken into consideration. This reduces the possibility that the second mobile unit will not arrive at the transfer point or the end point, or the second mobile unit will travel inefficiently after the transfer. Therefore, according to the present disclosure, it is possible to reduce the possibility that the delivery of the delivery object will end in failure due to depletion of moving energy of mobile units.

In the determining of the destination in the delivery plan generating method described above, a first supply point where the first mobile unit is supplied with energy may be further determined as a destination, and in the generating, a delivery plan may be generated for causing the first mobile unit to travel via the start point and the transfer point determined in order to the first supply point determined and causing the second mobile unit to travel via the transfer point determined to the end point.

According to this configuration, the first supply point where the first mobile unit is supplied with energy is determined as a destination. This reduces the possibility that the first mobile unit will run out of energy and become incapable of travelling after completion of the transfer.

In the determining of the destination in the delivery plan generating method described above, the transfer point, the first supply point, and a second supply point where the second mobile unit is supplied with energy may each be determined as the destination with reference to the start point, the end point, the position of the first mobile unit, and the position of the second mobile unit, and in the generating, a delivery plan may be generated for causing the first mobile unit to travel via the start point and the transfer point determined in order to the first supply point determined and causing the second mobile unit to travel via the transfer point determined and the end point in order to the second supply point determined.

According to this configuration, the second supply point where the second mobile unit is supplied with energy is also determined as a destination. This reduces the possibility that the second mobile unit will run out of energy and become incapable of travelling after completion of the delivery of the delivery object.

The delivery plan generating method described above may further include estimating a transition of an amount of remaining energy in the second mobile unit when travelling to the end point. In the determining of the destination, the destination may be determined with reference to the transition of the amount of remaining energy estimated.

This configuration makes it possible to transfer the delivery object to another mobile unit and complete the delivery efficiently from the viewpoint of energy consumption.

In the determining of the destination in the delivery plan generating method described above, the destination may be determined to ensure that the amount of remaining energy in the second mobile unit when execution of the delivery plan generated is completed, which is obtained from the transition of the amount of remaining energy estimated, does not become less than or equal to a predetermined threshold value.

This configuration makes it possible to reduce the depletion of energy by transferring the delivery object to another mobile unit and completing the delivery.

In the determining of the destination in the delivery plan generating method described above, the destination may be determined with reference to one or more amounts of remaining energy in the second mobile unit, obtained from the transition of the amount of remaining energy estimated, out of the amount of remaining energy in the second mobile unit located at the end point and the amount of remaining energy in the second mobile unit that has arrived at each point of candidates for the destination.

This configuration makes it possible to improve the efficiency of energy consumption by transferring the delivery object to another mobile unit and completing the delivery. It is also possible to more reliably avoid the depletion of energy of the second mobile unit. That is, this configuration can further reduce the possibility that the delivery of the delivery object will end in failure due to depletion of moving energy of mobile units.

The delivery plan generating method described above may further include acquiring a travel distance of the second mobile unit when travelling to the end point. In the determining of the destination, the destination may be determined with reference to the travel distance acquired.

This configuration makes it possible to transfer the delivery object to another mobile unit and complete the delivery efficiently from the viewpoint of the travel distance. That is, it is possible to reduce the travel distance while reducing the possibility that the delivery of the delivery object will end in failure.

The delivery plan generating method described above may further include estimating a time required for the second mobile unit to travel to the end point. In the determining of the destination, the destination may be determined with reference to the time required that has been estimated.

This configuration makes it possible to transfer the delivery object to another mobile unit and complete the delivery efficiently from the viewpoint of the time required. That is, it is possible to reduce the time required while reducing the possibility that the delivery of the delivery object will end in failure.

The determining of the destination in the delivery plan generating method described above may include acquiring a position of each mobile unit in a mobile unit group, and selecting the first mobile unit and the second mobile unit from the mobile unit group with reference to the start point, the end point, and the position of each mobile unit acquired.

According to this configuration, it is possible to select the first mobile unit and the second mobile unit that are less susceptible to depletion of moving energy from the mobile unit group. This further reduces the possibility that the delivery of the delivery object will end in failure due to depletion of moving energy of mobile units.

A delivery plan generating system according to one aspect of the present disclosure includes a start-point determiner that determines a start point, the start point being either a point where delivery of a delivery object starts or a point where a first mobile unit that is delivering the delivery object is located, an end-point determiner that determines an end point, the end point being either a point where the delivery of the delivery object finishes or a point where a second mobile unit that takes over the delivery object from the first mobile unit finishes the delivery of the delivery object, a destination determiner that determines a transfer point as a destination with reference to the start point, the end point, a position of the first mobile unit, and a position of the second mobile unit, the transfer point being a point where the delivery object is transferred from the first mobile unit to the second mobile unit, and a plan generator that generates a delivery plan for causing the first mobile unit to travel via the start point to the transfer point determined by the destination determiner and causing the second mobile unit to travel via the transfer point determined by the destination determiner to the end point.

This makes it possible to provide a delivery plan generating system that can reduce the possibility that the delivery of the delivery object will end in failure due to depletion of moving energy of mobile units.

Each embodiment described below shows one specific example of the present disclosure. Numerical values, shapes, constituent elements, steps, the sequence of steps, and so on described in the following embodiments are merely examples and not intended to limit the present disclosure. Among the constituent elements described in the following embodiments, those that are not recited in any independent claim, which represents the broadest concept, are described as arbitrary constituent elements. The contents of each of all the embodiments may be combined.

Embodiment 1

An overall configuration of a delivery plan generating system and a delivery plan generating method executed by the delivery plan generating system according to Embodiment 1 of the present disclosure will be described in detail hereinafter.

FIG. 1 is a diagram illustrating an overall configuration of delivery plan generating system 1 according to Embodiment 1.

As illustrated in FIG. 1, delivery plan generating system 1 includes start-point determiner 101, end-point determiner 102, destination determiner 104, and plan generator 105.

Delivery plan generating system 1 is a delivery plan generating system that generates a delivery plan for transferring a delivery object from a first mobile unit to a second mobile unit and thereby delivering the delivery object from a start point to an end point. That is, according to the delivery plan generated by delivery plan generating system 1, even if the delivery distance is too long to travel for a single mobile unit that is even in a fully charged condition, it is possible to complete the delivery because the delivery object is transferred from the first mobile unit to the second mobile unit during the delivery. In particular, the first mobile unit and the second mobile unit cooperate with each other during the delivery. This eliminates the need for the time to supply energy during the delivery of the delivery object and improves the efficiency of the delivery.

The mobile unit may, for example, be a vehicle, but this is merely an example and the mobile unit may be a drone, an aircraft, or a marine vessel, for example.

The delivery object may, for example, be a parcel or a passenger. These are, however, merely examples and not intended to limit the present disclosure.

Start-point determiner 101 sets either a point where delivery of a delivery object starts or a point where the first mobile unit that is delivering a delivery object is located, as a start point (i.e., determines the start point). When the start point is the point where delivery of a delivery object starts, the delivery plan is generated before the start of the delivery of the delivery object. When the start point is the point where the first mobile unit that is delivering a delivery object is located, the delivery plan is generated while the first mobile unit is delivering the delivery object.

End-point determiner 102 sets either a point where the delivery of the delivery object finishes or a point where the second mobile unit that takes over the delivery object from the first mobile unit finishes the delivery of the delivery object, as an end point (i.e., determines the end point).

Destination determiner 104 determines a transfer point where the delivery object is transferred from the first mobile unit to the second mobile unit and a first supply point where the first mobile unit is supplied with energy, as destinations, with reference to the start point, the end point, the position of the first mobile unit, and the position of the second mobile unit.

Destination determiner 104 may also determine a second supply point where the second mobile unit is supplied with energy, as a destination, with reference to the start point, the end point, the position of the first mobile unit, and the position of the second mobile unit. The case where destination determiner 104 also determines the second supply point as a destination is merely one example, and the second supply point does not necessarily have to be determined as a destination.

Plan generator 105 generates a delivery plan for causing the first mobile unit to travel via the start point and the transfer point determined by destination determiner 104 in order to the first supply point determined by destination determiner 104 and causing the second mobile unit to travel via the transfer point determined by destination determiner 104 to the end point. For example, the delivery plan includes a schedule indicating when and where the first mobile unit and the second mobile unit should arrive. By executing this delivery plan, the first mobile unit travels to the start point, starts the delivery of a delivery object at the start point, and thereafter travels to the transfer point. On the other hand, for example, the second mobile unit travels so as to arrive at the transfer point at the time indicated by the schedule included in the delivery plan. At the transfer point, the delivery object is transferred from the first mobile unit to the second mobile unit. After completion of the transfer of the delivery object, the first mobile unit travels to the first supply point and is supplied with energy. On the other hand, the second mobile unit travels to the end point and finishes the delivery of the delivery object at the end point.

In the case where destination determiner 104 also determines the second supply point as a destination, plan generator 105 generates a delivery plan for causing the first mobile unit to travel via the start point and the transfer point determined by destination determiner 104 in order to the first supply point determined by destination determiner 104 and causing the second mobile unit to travel via the transfer point determined by destination determiner 104 and the end point in order to the second supply point determined by destination determiner 104. By executing this delivery plan, the second mobile unit travels to the second supply point and is supplied with energy after having finished the delivery of the delivery object at the end point.

Starting the delivery of a delivery object corresponds to, for example, coupling a towed vehicle to the first mobile unit when the delivery object is a parcel and the first and second mobile units are trailers, loading a parcel on to the first mobile unit when the delivery object is a parcel and the first and second mobile units are trucks, or causing a passenger to ride in the first mobile when the delivery object is a passenger. These are, however, merely examples and not intended to limit the present disclosure.

Transferring a delivery object corresponds to, for example, re-connecting a towed vehicle from the first mobile unit to the second mobile unit when the delivery object is a parcel and the first and second mobile units are trailers, transshipping a parcel from the first mobile unit to the second mobile unit when the delivery object is a parcel and the first and second mobile units are trucks, or causing a passenger to transfer from the first mobile unit to the second mobile unit when the delivery object is a passenger. These are, however, merely examples and not intended to limit the present disclosure.

Finishing the delivery of a delivery object corresponds to, for example, separating a towed vehicle from the second mobile unit when the delivery object is a parcel and the first and second mobile units are trailers, dislodging a parcel from the second mobile unit when the delivery object is a parcel and the first and second mobile units are trucks, or causing a passenger to get off the second mobile unit when the delivery object is a passenger. These are, however, merely examples and not intended to limit the present disclosure.

Supplying energy corresponds to, for example, charging an EV or replacing or adding a battery when the mobile units are EVs, refueling a gasoline-powered vehicle or replacing or adding a gasoline tank when the mobile units are gasoline-powered vehicles, or charging a fuel-cell-powered vehicle with hydrogen or replacing or adding a hydrogen tank when the mobile units are fuel-cell-powered vehicles. These are, however, merely examples and not intended to limit the present disclosure.

In the case where the first mobile unit has already passed through the start point, i.e., the first mobile unit is already delivering a delivery object, plan generator 105 generates a delivery plan for causing the first mobile unit to travel via the current position of the first mobile unit as a start point and the transfer point determined by destination determiner 104 (specifically, travel from the current position of the first mobile unit via the transfer point) to the first supply point determined by destination determiner 104 and causing the second mobile unit to travel via the transfer point determined by destination determiner 104 to the end point.

In the case where destination determiner 104 also determines the second supply point as a destination and the first mobile unit has already passed through the start point, plan generator 105 generates a delivery plan for causing the first mobile unit to travel via the current position of the first mobile unit as the start point and the transfer point determined by destination determiner 104 to the first supply point determined by destination determiner 104 and causing the second mobile unit to travel via the transfer point determined by destination determiner 104 and the end point in order to the second supply point determined by destination determiner 104.

The transfer point may, for example, be an arbitrary point on a road, a distribution point, or a parking lot. These are, however, merely examples and not intended to limit the present disclosures.

The first supply point and the second supply point may, for example, be charging stations, gas stations, hydrogen stations, charging ports, distribution points where gasoline or hydrogen is available, or arbitrary points where it is possible to bring in gasoline or hydrogen. These are, however, merely examples and not intended to limit the present disclosure.

Some or all of the start point, the end point, the transfer point, the first supply point, the second supply point, the position of the first mobile unit, and the position of the second mobile unit may be the same point.

Next, examples of the delivery plan will be described with reference to FIGS. 2A and 2B. Here, cases are described in which the delivery plan is generated before the start of delivery of a delivery object.

Figure 2A:
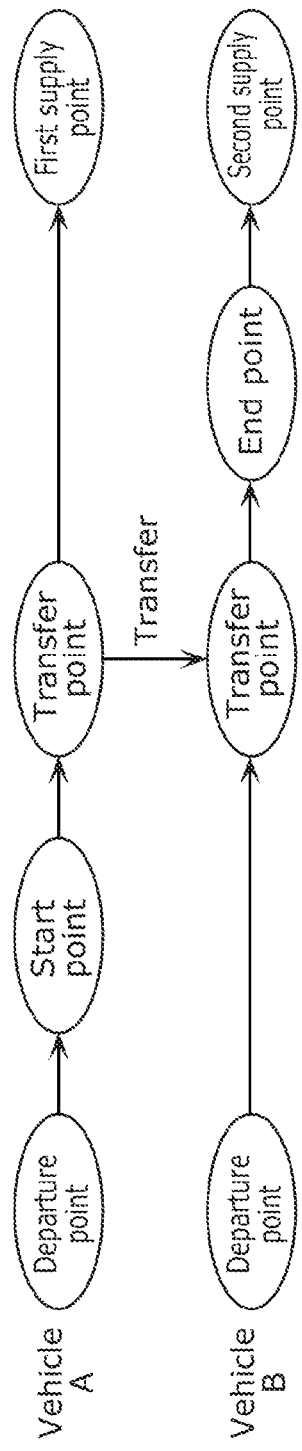
FIG. 2A is a diagram for describing one example of a delivery plan.

FIG. 2A is a diagram for describing one example of the delivery plan. FIG. 2A is a schematic illustration of a flow of processing for transferring a delivery object from vehicle A to vehicle B and completing the delivery.

In the relationship between vehicles A and B, vehicle A corresponds to the first mobile unit that starts the delivery of a delivery object at the start point, and vehicle B corresponds to the second mobile unit that takes over the delivery object from vehicle A and finishes the delivery at the end point. Vehicle A starts the delivery of the delivery object at the start point and transfers the delivery object at the transfer point in accordance with the delivery plan. Vehicle A then heads for the first supply point. Vehicle B takes over the delivery object at the transfer point and finishes the delivery of the delivery object at the end point in accordance with the delivery plan. Vehicle B then heads for the second supply point.

The delivery does not necessarily have to be conducted by only two mobile units as illustrated in FIG. 2A, and may be conducted by three or more mobile units.

Figure 2B:
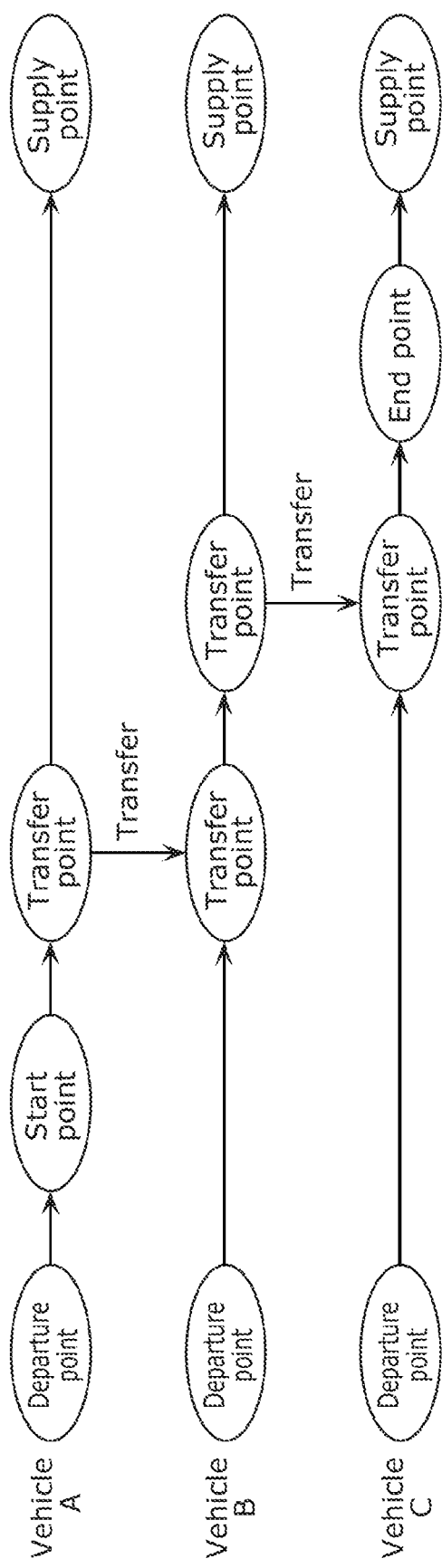
FIG. 2B is a diagram for describing another example of the delivery plan.

FIG. 2B is a diagram for describing another example of the delivery plan. FIG. 2B shows an example in which delivery is conducted by three or more mobile units. Specifically, FIG. 2B is an illustration of a flow of processing for transferring a delivery objects from vehicle A to vehicle B and further from vehicle B to vehicle C and finishing the delivery.

In the relationship between vehicles A and B, vehicle A corresponds to the first mobile unit that starts delivery of a delivery object at the start point, and vehicle B corresponds to the second mobile unit that takes over the delivery object from vehicle A and finishes the delivery at the end point. In this case, the end point for vehicle B corresponds to the transfer point of the delivery object for vehicle C.

In the relationship between vehicles B and C, vehicle B corresponds to the first mobile unit that starts the delivery of the delivery object at the start point, and vehicle C corresponds to the second mobile unit that takes over the delivery object from vehicle B and finishes the delivery at the end point. In this case, the start point for vehicle B corresponds to the transfer point where the delivery object is transferred from vehicle A.

In this way, when the delivery is conducted by three or more mobile units, the start or end point can be the transfer point. In the example in FIG. 2B, the transfer point in the relationship between vehicles A and B corresponds to the start point in the relationship between vehicles B and C, and the end point in the relationship between vehicles A and B corresponds to the transfer point in the relationship between vehicles B and C.

Next, the operation of delivery plan generating system 1, i.e., details of a delivery plan generating method executed by delivery plan generating system 1, will be described with reference to FIG. 3 and FIGS. 4A to 4E. Delivery plan generating system 1 is implemented as, for example, a computer, and accordingly the delivery plan generating method can be said to be a method executed by the computer.

Figure 3:
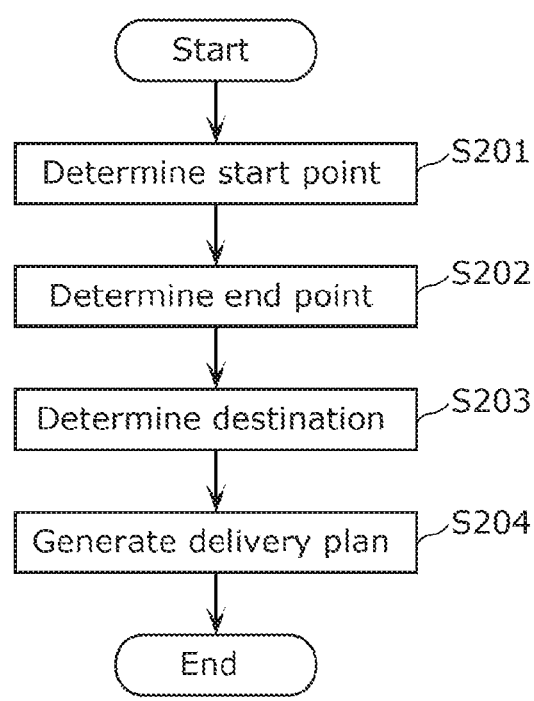
FIG. 3 is a flowchart showing one example of a delivery plan generating method executed by the delivery plan generating system according to Embodiment 1.

FIG. 3 is a flowchart showing one example of the delivery plan generating method executed by delivery plan generating system 1 according to Embodiment 1. FIGS. 4A to 4E are diagrams for describing a flow of processing until completion of the execution of the delivery plan.

Start-point determiner 101 determines the start point (step S201). For example, the start point is determined as illustrated in FIG. 4A.

Examples of specific means for start-point determiner 101 to determine the start point include means such as equipping start-point determiner 101 with a touch panel that receives input of the start point from a user. In this case, for example, start-point determiner 101 may display a map on the touch panel and allows input of the start point with a touch of the start point in the map. For example, start-point determiner 101 may set, as the start point, either a point touched in the map and where delivery of a delivery object starts or a point where the first mobile unit that is delivering a delivery object is located. The examples also include means such as equipping start-point determiner 101 with communication means and determining the start point via communication with an external system. For example, start-point determiner 101 may set, as the start point, either a point received from the external system and where delivery of a delivery object starts or a point where the first mobile unit that is delivering a delivery object is located. These are, however, merely examples and not intended to limit the present disclosure.

End-point determiner 102 determines the end point (step S202). For example, the end point is determined as illustrated in FIG. 4A.

Examples of specific means for end-point determiner 102 to determine the end point include means such as equipping end-point determiner 102 with a touch panel that receives input of the end point from a user. In this case, for example, end-point determiner 102 may display a map on the touch panel and allows input of the end point with a touch of the end point in the map. For example, end-point determiner 102 may set, as the end point, either a point touched in the map and where the delivery of the delivery object finishes or a point where the delivery of the delivery object by the second mobile unit that takes over the delivery object from the first mobile unit finishes the delivery of the delivery object. The examples also include means such as equipping end-point determiner 102 with communication means and acquiring the end point from an external system via communication. For example, end-point determiner 102 may set, as the end point, either a point received from the external terminal and where the delivery of the delivery object finishes or a point where the second mobile unit that takes over the delivery object from the first mobile unit finishes the delivery of the delivery object. These are, however, merely examples and not intended to limit the present disclosure.

Although FIG. 3 is a flowchart in which steps S201 and S202 are sequentially executed in order, steps S201 and S202 do not necessarily have to be sequentially executed in this order and each may be executed an arbitrary number of times at arbitrary times before execution of step S203. As another alternative, for example, each of steps S201 and S202 may be triggered and executed for the first time when execution of step S203 becomes necessary, or may be executed in advance before execution of step S203. In the case where steps S201 and S202 are executed in advance before execution of step S203, each step may be executed at regular time intervals or may be triggered and executed by some sort of event. These are, however, merely examples and not intended to limit the present disclosure.

For example, the start point, the end point, the position of first mobile unit 10, and the position of second mobile unit 20 are acquired as illustrated in FIG. 4A.

Destination determiner 104 determines the transfer point where the delivery object is transferred from the first mobile unit to the second mobile unit and the first supply point where the first mobile unit is supplied with energy, as destinations, with reference to the start point, the end point, the position of the first mobile unit, and the position of the second mobile unit (step S203). Destination determiner 104 may further determine the second supply point where the second mobile unit is supplied with energy as a destination.

For example, destination determiner 104 acquires the positions of the first and second mobile units and uses the acquired positions of the first and second mobile units to determine destinations. For example, the position of first mobile unit 10 (first departure point) and the position of second mobile unit 20 (second departure point) as illustrated in FIG. 4A are acquired. Examples of specific means for destination determiner 104 to acquire the positions of the first and second mobile units include the following means. For example, destination determiner 104 may be equipped with communication means, and each of the first and second mobile units may be equipped with a global positioning system (GPS) receiver and communication means. Then, each of the first and second mobile units may receive the current position via the GPS receiver and transmit the received current position to destination determiner 104 via the communication means, whereas destination determiner 104 may receive the current positions of the first and second mobile units, transmitted from the first and second mobile units, as the positions of the first and second mobile units via the communication means. In this way, destination determiner 104 acquires the position of the first mobile unit and the position of the second mobile unit. The positions of the first and second mobile units are expressed in latitude and longitude. In the case where delivery plan generating system 1 is provided in the first mobile unit or the second mobile unit, destination determiner 104 may acquire the current position received via the GPS receiver as the position of the first mobile unit or the position of the second mobile unit without the intervention of the communication means. These are, however, merely examples and not intended to limit the present disclosure.

Examples of specific means for destination determiner 104 to determine the transfer point as a destination include means such as determining a point that is closest to the midpoint between the start point and the end point, such as a point on a road, a distribution point, or a parking lot, as a candidate for the transfer point. According to the present disclosure, the destination is determined based on not only the start point and the end point, but also the position of the first mobile unit and the position of the second mobile unit. Thus, in order to also take the positions of the first and second mobile units into consideration for the determination of destinations, destination determiner 104 calculates, for example, a difference between the distance from the position of the first mobile unit to the start point and the distance from the position of the second mobile unit to the candidate for the transfer point (i.e., the midpoint between the start point and the end point). For example, if the distance from the position of the first mobile unit to the start point is greater than the distance from the position of the second mobile unit to the above midpoint, destination determiner 104 may determine, as the transfer point, for example a point on the road, a distribution point, or a parking lot that is closest to a point that is close by a half of the above difference to the start point from the above midpoint. If the distance from the position of the first mobile unit to the start point is less than the distance from the position of the second mobile unit to the above midpoint, destination determiner 104 may determine, as the transfer point, for example a point on the road, a distribution point, or a parking lot that is closest to a point that is close by a half of the above different to the end point from the above midpoint. In this way, according to the present disclosure, the circumstances of the second mobile unit are also taken into consideration to determine the transfer point. Examples of specific means for destination determiner 104 to determine the first supply point and the second supply point as destinations include means such as determining an available supply point that is closest to the determined transfer point as the first supply point and determining an available supply point that is closest to the end point as the candidate for the second supply point. These are, however, merely examples and not intended to limit the present disclosure.

Figure 4B:
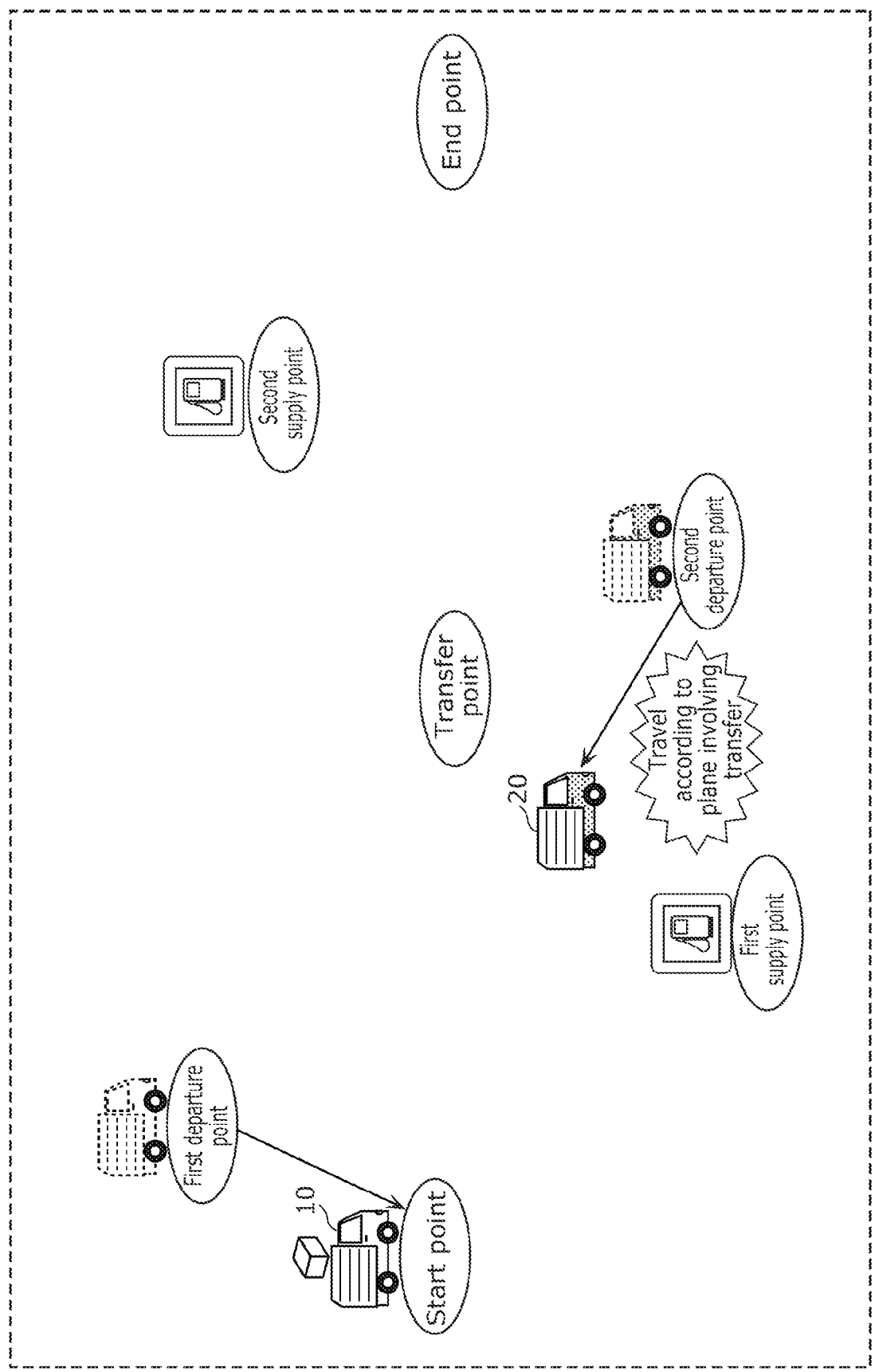
FIG. 4B is a diagram for describing a flow of processing until the execution of the delivery plan is completed.

For example, the transfer point, the first supply point, and the second supply point are determined as destinations as schematically illustrated in FIG. 4B.

Next, plan generator 105 generates a delivery plan for causing the first mobile unit to travel via the start point and the transfer point determined by destination determiner 104 in order to the first supply point determined by destination determiner 104 and causing the second mobile unit to travel via the transfer point determined by destination determiner 104 to the end point. In the case where destination determiner 104 also determines the second supply point as a destination, plan generator 105 generates a delivery plan for causing the first mobile unit to travel via the start point and the transfer point determined by destination determiner 104 in order to the first supply point determined by destination determiner 104 and causing the second mobile unit to travel via the transfer point determined by destination determiner 104 and the end point in order to the second supply point determined by destination determiner 104 (step S204).

Examples of specific means for plan generator 105 to generate a delivery plan include means such as applying a known solution to a combinational optimization problem such as a vehicle routing problem (VRP) or a traveling salesman problem (TSP). These are, however, merely examples and not intended to limit the present disclosure.

Then, the first mobile unit and the second mobile unit travel in accordance with the generated delivery plan. Specifically, as illustrated in FIG. 4B, first mobile unit 10 heads for the start point, and second mobile unit 20 travels in accordance with the delivery plan that involves transfer of the delivery object. For example, second mobile unit 20 is involved in other delivery until the time when second mobile unit 20 should arrive at the transfer point designated by the delivery plan. At this time, second mobile unit 20 is involved in delivery that is conducted in the vicinity of the transfer point as close as possible and avoids being involved in delivery that is conducted away from the transfer point. This minimizes energy consumption when the second mobile unit heads for the transfer point, and suppresses depletion of moving energy of the mobile unit. That is, the delivery object can be transferred more reliably.

Figure 4C:
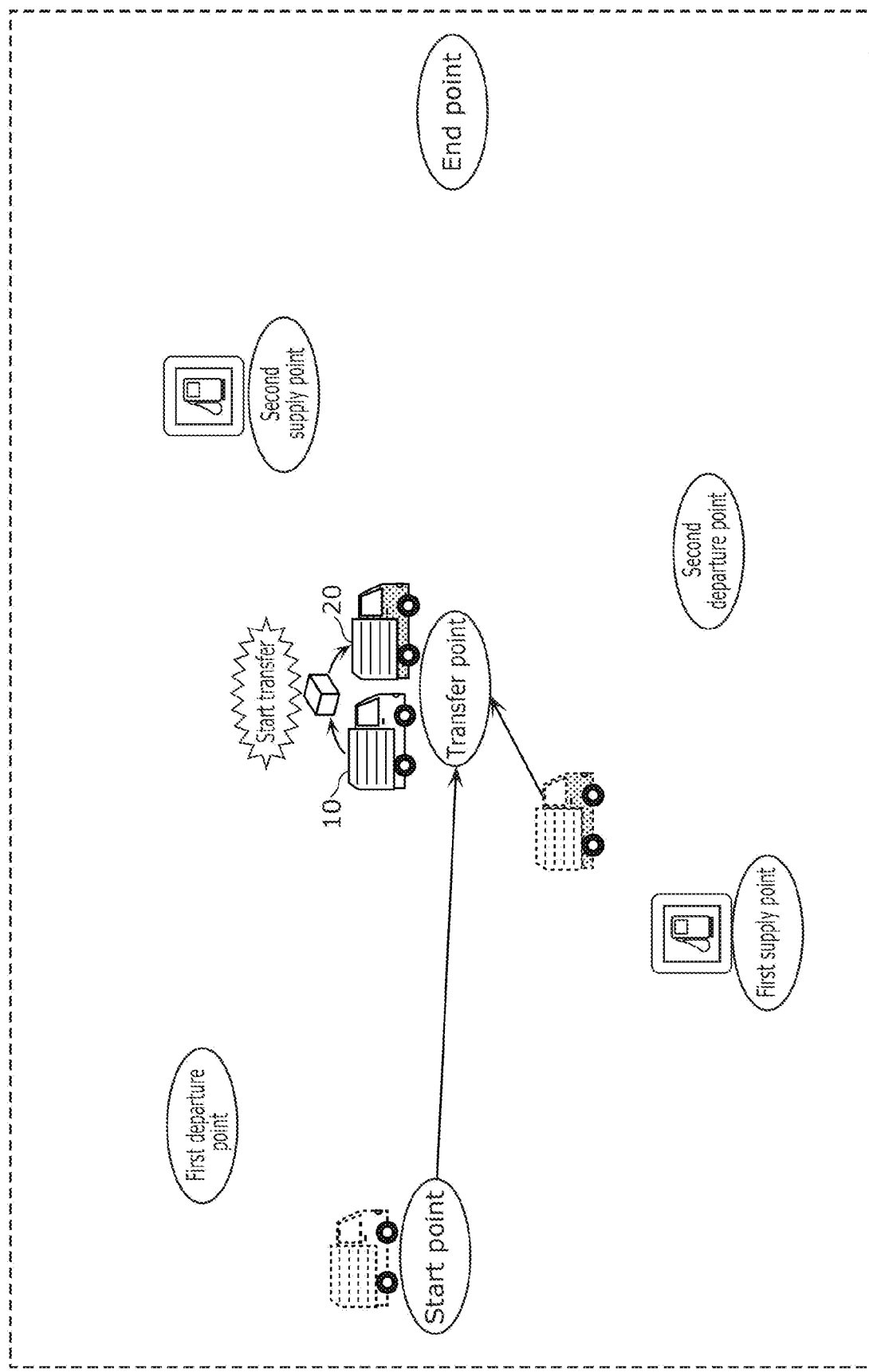
FIG. 4C is a diagram for describing a flow of processing until the execution of the delivery plan is completed.

Since first mobile unit 10 and second mobile unit 20 travel in accordance with the delivery plan that involves transfer of the delivery object, the delivery object can be transferred more reliably from first mobile unit 10 to second mobile unit 20 at the transfer point as illustrated in FIG. 4C. In particular, second mobile unit 20 can reliably head for the transfer point because the second mobile unit is not located largely away from the transfer point in accordance with the delivery plan that involves transfer of the delivery object.

Figure 4D:
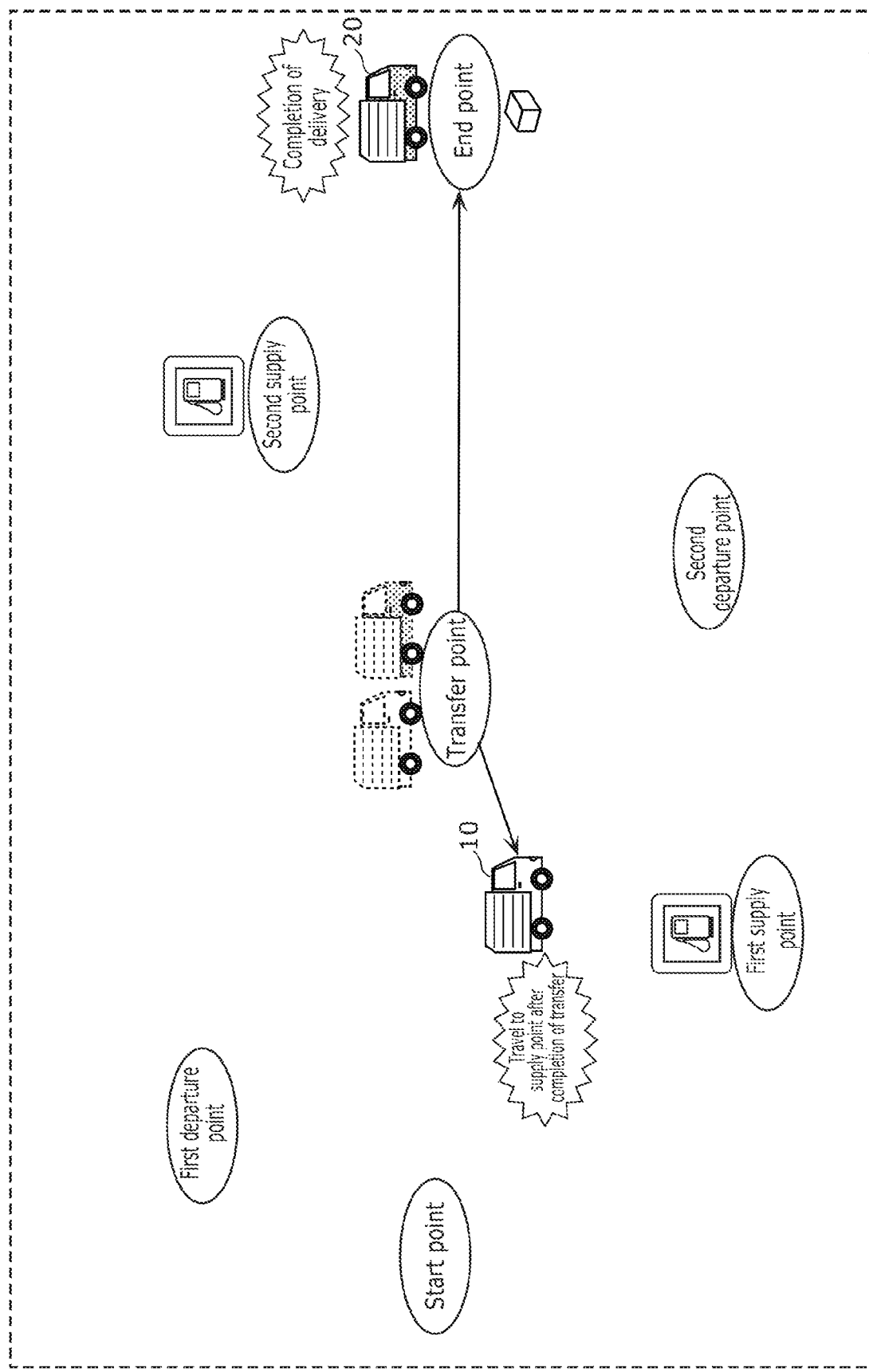
FIG. 4D is a diagram for describing a flow of processing until the execution of the delivery plan is completed.

After the transfer of the delivery object is completed as illustrated in FIG. 4D, first mobile unit 10 heads for the first supply point. Second mobile unit 20 heads for the end point and completes the delivery.

Figure 4E:
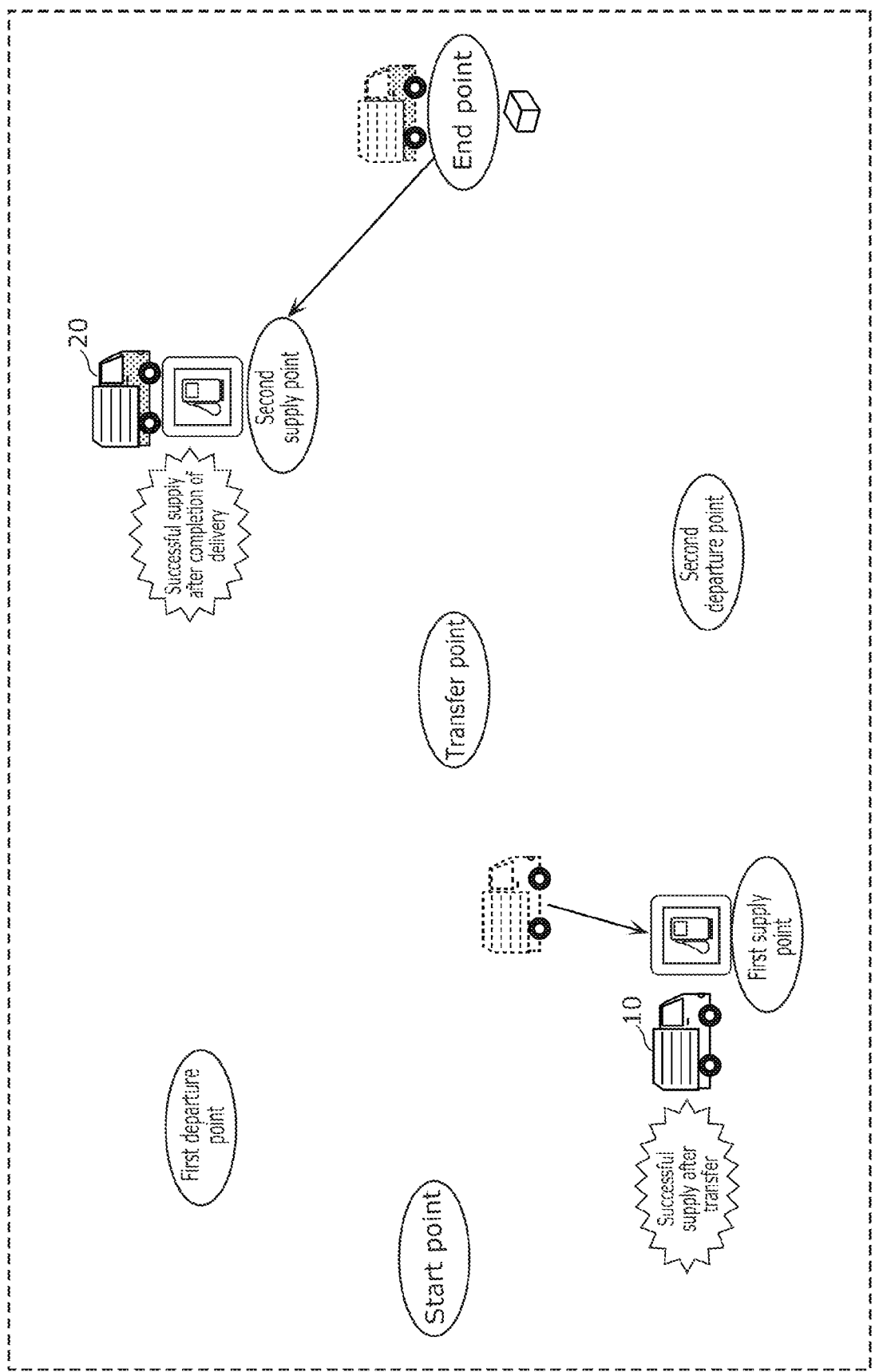
FIG. 4E is a diagram for describing a flow of processing until the execution of the delivery plan is completed.

Then, as illustrated in FIG. 4E, first mobile unit 10 is supplied with energy at the first supply point, and second mobile unit 20 is supplied with energy at the second supply point and completes the execution of the delivery plan.

Note that plan generator 105 may generate a delivery plan that causes the first and second mobile units to pass through points other than the destinations determined by destination determiner 104, as necessary.

Although FIG. 3 is a flowchart in which steps S203 and S204 are sequentially executed in order, steps S203 and S204 do not necessarily have to be sequentially executed in this order.

For example, steps S203 and S204 may be repeatedly executed until a certain criterion is satisfied. In this case, for example, an evaluation function for evaluating the delivery plan generated in step S204 may be defined in advance, and if an evaluation value obtained by evaluating the delivery plan generated in step S204 with reference to the evaluation function is less than a predetermined threshold value, destination determiner 104 may execute step S203 again to re-determine the destinations, and plan generator 105 may re-generate the delivery plan by executing step S204 again with reference to the re-determined destinations.

As another alternative, for example, the processing in step S203 and the processing in step S204 may be integrated and executed together. In this case, for example, plan generator 105 may invoke the processing for determining destinations in step S203 during execution of the processing for generating the delivery plan in step S204, or may divide each of the processing in step S203 and the processing in step S204 into several sub-processes and invoke each sub-process based on the divisions of the processing.

Note that these specific examples relating to the execution sequence of steps S203 and S204 are merely examples and not intended to limit the present disclosure.

Each processing in the delivery plan generating method may be started at an arbitrary time during operation of the first and second mobile units. For example, before departure of the first and second mobile units, delivery plan generating system 1 may complete the execution of each processing in the delivery plan generating method, determine in advance a delivery plan involving transfer of a delivery object, and then cause the first and second mobile units to execute this delivery plan. As another alternative, while the first and second mobile units are each executing a delivery plan that does not take into consideration the transfer of a delivery object or each are travelling without using any delivery plan, delivery plan generating system 1 may start the execution of each processing in the delivery plan generating method and cause the first and second mobile units to execute the generated delivery plan that involves transfer of a delivery object. In this case, each processing in the delivery plan generating method may be triggered and executed when the amount of energy remaining in the first mobile unit becomes less than or equal to a predetermined threshold value.

Note that these specific examples relating to the timing of execution of each processing in the delivery plan generating method are merely examples and not intended to limit the present disclosure.

As described above, according to Embodiment 1, even if the delivery distance is too long to travel for a single mobile unit that is even in a fully charged condition, it is possible to complete the delivery because the delivery object is delivered by being transferred from the first mobile unit to the second mobile unit. The transfer point where the delivery object is transferred from the first mobile unit to the second mobile unit is determined based on not only the start point, the end point, and the position of the first mobile unit but also the position of the second mobile unit, i.e., the circumstances of the second mobile unit are also taken into consideration. This reduces the possibility that the second mobile unit will fail to arrive at the transfer point or the end point or will travel insufficiently after the transfer. Therefore, according to the present disclosure, it is possible to reduce the possibility that the delivery of the delivery object will end in failure due to depletion of moving energy of the mobile unit. Besides, since the first supply point where the first mobile unit is supplied with energy is determined as a destination, it is possible to reduce the possibility that the first mobile unit will become incapable of travelling due to depletion of every after completion of the transfer.

In the case where destination determiner 104 also determines the second supply point as a destination, it is also possible to reduce the possibility that the second mobile unit, which has taken over the delivery object from the first mobile unit, will become incapable of travelling due to depletion of energy after completion of the delivery of the delivery object.

Variation of Embodiment 1

The first and second mobile units do not necessarily have to be predetermined specific mobile units, and may be selected from a mobile unit group. For example, destination determiner 104 may acquire the position of each mobile unit from a mobile unit group and select the first and second mobile units from the mobile unit group with reference to the start point, the end point, and the acquired position of each mobile unit.

Specifically, the delivery plan generating system according to a variation of Embodiment 1 is a delivery plan generating system that selects first and second mobile units from a mobile unit group and generates a delivery plan for causing the selected first and second mobile units to deliver a delivery object from the start point to the end point, the delivery plan involving transfer of the delivery object from the first mobile unit to the second mobile unit. Each mobile unit in the mobile unit group is to be used for delivery or other purposes in the delivery plan generated by delivery plan generating system 1 and is, for example, registered in advance before operation of delivery plan generating system 1. The operation of such a delivery plan generating system according to the variation of Embodiment 1, i.e., details of a delivery plan generating method executed by this delivery plan generating system, will be described with reference to FIGS. 5 and 6.

First, one example of the delivery plan generating method executed by the delivery plan generating system according to the variation of Embodiment 1 will be described with reference to FIG. 5.

Figure 5:
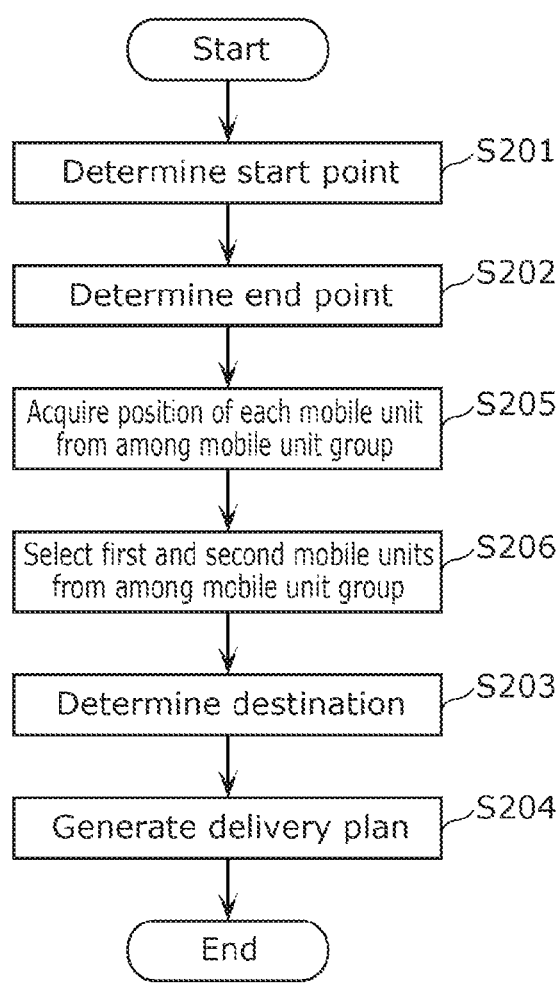
FIG. 5 is a flowchart showing one example of a delivery plan generating method executed by a delivery plan generating system according to a variation of Embodiment 1.

FIG. 5 is a flowchart showing one example of the delivery plan generating method executed by the delivery plan generating system according to the variation of Embodiment 1. Since steps S201, S202, S203, and S204 are the same as those in the delivery plan generating method executed by delivery plan generating system 1 according to Embodiment 1, a description thereof shall be omitted, and the following description focuses on differences, i.e., steps S205 and S206.

Destination determiner 104 acquires the position of each mobile unit in a mobile unit group (step S205).

Examples of specific means for destination determiner 104 to acquire the position of each mobile unit in the mobile unit group include the following means. For example, destination determiner 104 may include communication means, and each mobile unit in the mobile unit group may include a GPS receiver and communication means. Each mobile unit in the mobile unit group may receive its current position via the GPS receiver and transmit the received current position to destination determiner 104 via the communication means, whereas destination determiner 104 may receive the current position of each mobile unit in the mobile unit group, transmitted from the mobile unit, as the position of the mobile unit in the mobile unit group via the communication means. In this way, destination determiner 104 acquires the position of each mobile unit in the mobile unit group. For example, the position of each mobile unit in the mobile unit group is expressed in latitude and longitude. In the case where the delivery plan generating system according to the variation of Embodiment 1 is provided in each mobile unit in the mobile unit group, destination determiner 104 may acquire the current position received via the GPS receiver as the position of each mobile unit in the mobile unit group without the intervention of the communication means. Note that these are merely examples and not intended to limit the present disclosure.

Destination determiner 104 also selects the first and second mobile units from the mobile unit group with reference to the start point, the end point, and the acquired position of each mobile unit (step S206).

Examples of specific means for destination determiner 104 to select the first mobile unit from the mobile unit group include means such as selecting a mobile unit that is located closest to the start point among the mobile unit group as the first mobile unit. Examples of specific means for destination determiner 104 to select the second mobile unit from the mobile unit group include means such as selecting a mobile unit that is located closest to a candidate for the transfer point (e.g., a midpoint between the start point and the end point) among the mobile unit group as the second mobile unit. Note that these are merely examples and not intended to limit the present disclosure.

Destination determiner 104 then determines destinations with reference to the start point, the end point, and the positions of the first and second mobile units selected as described above (step S203).

Next, another example of the delivery plan generating method executed by the delivery plan generating system according to the variation of Embodiment 1 will be described with reference to FIG. 6.

Figure 6:
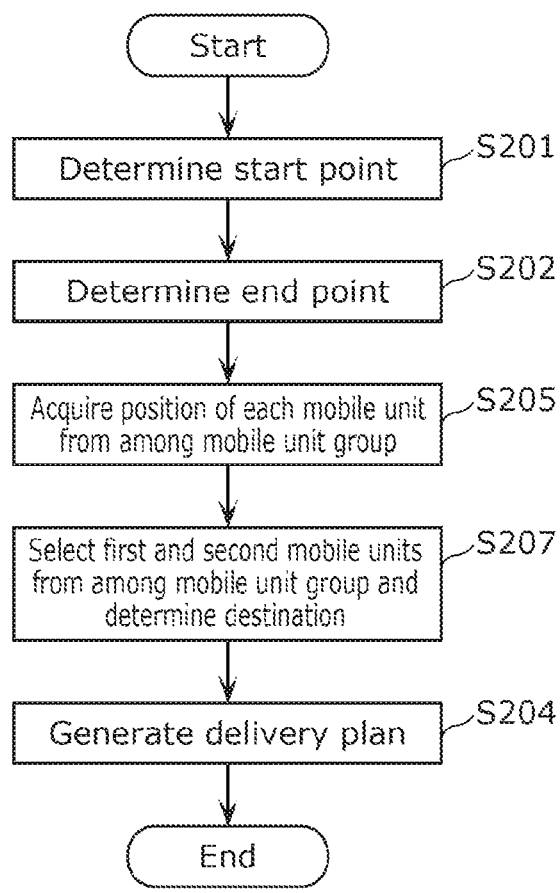
FIG. 6 is a flowchart showing another example of the delivery plan generating method executed by the delivery plan generating system according to the variation of Embodiment 1.

FIG. 6 is a flowchart showing another example of the delivery plan generating method executed by the delivery plan generating system according to the variation of Embodiment 1. Since steps S201, S202, S204, and S205 are the same as those in the delivery plan generating method executed by the delivery plan generating system according to the variation of Embodiment 1, a description thereof shall be omitted, and the following description focuses on differences, i.e., step S207.

Destination determiner 104 selects the first mobile unit and the second mobile unit from the mobile unit group with reference to the start point, the end point, and the acquired position of each mobile unit, and determines destinations (step S207). In the example in FIG. 5, destination determiner 104 determines destinations after the selection of the first and second mobile units from the mobile unit group, but the present disclosure is not limited to this example. For example, destination determiner 104 may perform the selection of the first and second mobile units and the determination of destinations at the same time. As another alternative, for example, destination determiner 104 may repeatedly perform the selection of the first and second mobile units and the determination of destinations so as to optimize ultimately determined destinations.

According to the variation of Embodiment 1 as well, each processing in the delivery plan generating method may be started at an arbitrary time during operation of each mobile unit in the mobile unit group. For example, before departure of each mobile unit in the mobile unit group, the delivery plan generating system according to the variation of Embodiment 1 may compete the execution of each processing in the delivery plan generating method, determine in advance a delivery plan that involves transfer of a delivery object, and then cause the selected first and second mobile units to execute this delivery plan. As another alternative, while each mobile unit in the mobile unit group is executing a delivery plan that does not take into consideration the transfer or is travelling without using any delivery plan, the delivery plan generating system according to the variation of Embodiment 1 may start the execution of each processing in the delivery plan generating method and cause the selected first and second mobile units to execute the generated delivery plan that involves transfer of a delivery object. For example, each processing in the delivery plan generating method may be triggered and executed when the amount of energy remaining in the first mobile unit becomes less than or equal to a predetermined threshold value. For example, in the case where the first mobile unit is already delivering a delivery object, destination determiner 104 selects the second mobile unit from the mobile unit group.

As described above, according to the variation of Embodiment 1, it is possible to select the first and second mobile units that are less susceptible to depletion of moving energy from the mobile unit group. This further reduces the possibility that the delivery of a delivery object will end in failure due to depletion of moving energy of the mobile unit.

Embodiment 2

The following is a detailed description of an overall configuration of a delivery plan generating system according to Embodiment 2 of the present disclosure, and a delivery plan generating method executed by the delivery plan generating system.

Figure 7:
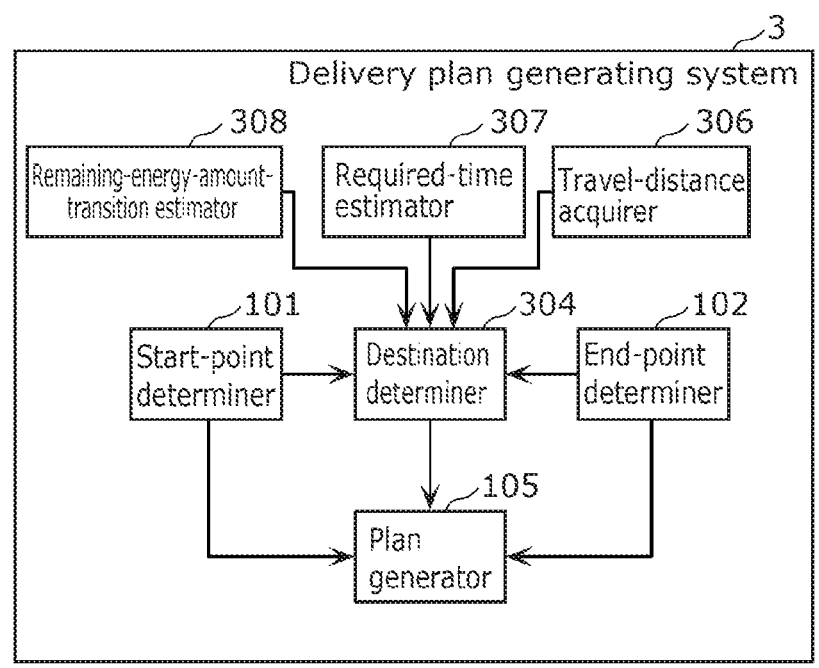
FIG. 7 is a diagram illustrating an overall configuration of a delivery plan generating system according to Embodiment 2.

FIG. 7 is a diagram illustrating an overall configuration of delivery plan generating system 3 according to Embodiment 2. Among constituent elements of delivery plan generating system 3 according to Embodiment 2, those that have the same functions as constituent elements of Embodiment 1 are given the same reference signs, and a description thereof shall be omitted.

As illustrated in FIG. 7, delivery plan generating system 3 includes start-point determiner 101, end-point determiner 102, destination determiner 304, plan generator 105, travel-distance acquirer 306, required-time estimator 307, and remaining-energy-amount transition estimator 308. Destination determiner 304 basically has the same function as destination determiner 104 according to Embodiment 1 or the variation of Embodiment 1.

Like delivery plan generating system 1, delivery plan generating system 3 is a delivery plan generating system that generates a delivery plan for transferring a delivery object from the first mobile unit to the second mobile unit and thereby delivering the delivery object from the start point to the end point.

Travel-distance acquirer 306 acquires a travel distance of the second mobile unit when travelling to the end point. For example, travel-distance acquirer 306 acquires travel distances of arbitrary sections when the second mobile unit travels to the end point. For example, travel-distance acquirer 306 acquires, as the travel distances of arbitrary sections, a travel distance of the second mobile unit when travelling from a departure point to a transfer point and a travel distance of the second mobile unit when travelling from the transfer point to an end point. In the case where destination determiner 304 also determines the second supply point as a destination, travel-distance acquirer 306 also acquires a travel distance of the second mobile unit when travelling to the second supply point. For example, travel-distance acquirer 306 acquires travel distances of arbitrary sections when the second mobile unit travels to the second supply point. For example, travel-distance acquirer 306 acquires, as the travel distances of arbitrary sections, not only the travel distance of the second mobile unit when travelling from the departure point to the transfer point and the travel distance of the second mobile unit when travelling from the transfer point to the end point, but also a travel distance of the second mobile unit when travelling from the end point to the second supply point. Travel-distance acquirer 306 may also acquire a travel distance of the first mobile unit when travelling to the first supply point. For example, travel-distance acquirer 306 may acquire travel distances of arbitrary sections when the first mobile unit travels to the first supply point. For example, travel-distance acquirer 306 may acquire, as the travel distances of arbitrary sections, a travel distance of the first mobile unit when travelling from a departure point to the start point, a travel distance of the first mobile unit when travelling from the start point to the transfer point, and a travel distance of the first mobile unit when travelling from the transfer point to the first supply point.

Required-time estimator 307 estimates the time required for the second mobile unit to travel to the end point. For example, required-time estimator 307 estimates required times of arbitrary sections when the second mobile unit travels to the end point. For example, required-time estimator 307 estimates, as the required times of arbitrary sections, the time required for the second mobile unit to travel from the departure point to the transfer point and the time required for the second mobile unit to travel from the transfer point to the end point. In the case where destination determiner 304 also determines the second supply point as a destination, required-time estimator 307 estimates the time required for the second mobile unit to travel to the second supply point. For example, required-time estimator 307 estimates required times of arbitrary sections when the second mobile unit travels to the second supply point. For example, required-time estimator 307 estimates, as the required times of arbitrary sections, not only the time required for the second mobile unit to travel from the departure point to the transfer point and the time required for the second mobile unit to travel from the transfer point to the end point, but also the time required for the second mobile unit to travel from the end point to the second supply point. Required-time estimator 307 may also estimate the time required for the first mobile unit to travel to the first supply point. For example, required-time estimator 307 may estimate the time required for the first mobile unit to travel to the first supply point in an arbitrary section. For example, required-time estimator 307 may estimate required times of arbitrary sections when the first mobile unit travels from the departure point to the start point. For example, required-time estimator 307 may estimate, as the required times of arbitrary sections, the time required for the first mobile unit to travel from the departure point to the start point, the time required for the first mobile unit to travel from the start point to the transfer point, and the time required for the first mobile unit to travel from the transfer point to the first supply point.

Remaining-energy-amount transition estimator 308 estimates a transition of the amount of energy remaining in the second mobile unit when travelling to the end point. For example, remaining-energy-amount transition estimator 308 estimates transitions of the amounts of energy remaining for arbitrary sections when the second mobile unit travels to the end point. For example, remaining-energy-amount transition estimator 308 estimates, as the transitions of the amounts energy remaining for the arbitrary sections, a transition of the amount of energy remaining in the second mobile unit when travelling from the departure point to the transfer point and a transition of the amount of energy remaining in the second mobile unit when travelling from the transfer point to the end point. In the case where destination determiner 304 also determines the second supply point as a destination, remaining-energy-amount transition estimator 308 also estimates a transition of the amount of energy remaining in the second mobile unit when travelling to the second supply point. For example, remaining-energy-amount transition estimator 308 estimates the transition of the remaining amount of energy in an arbitrary section when the second mobile unit travels to the second supply point. For example, remaining-energy-amount transition estimator 308 estimates, as the transitions of the amounts of energy remaining for the arbitrary sections, not only the transition of the amount of energy remaining in the second mobile unit when travelling from the departure point to the transfer point and the transition of the amount of energy remaining in the second mobile unit when travelling from the transfer point to the end point, but also a transition of the amount of energy remaining in the second mobile unit when travelling from the end point to the second supply point. Remaining-energy-amount transition estimator 308 may also estimate a transition of the amount of energy remaining in the first mobile unit when travelling to the first supply point. For example, remaining-energy-amount transition estimator 308 may estimate transitions of the amounts of energy remaining for arbitrary sections when the first mobile unit travels to the first supply point. For example, remaining-energy-amount transition estimator 308 may estimate, as the transitions of the amounts of energy remaining for the arbitrary sections, a transition of the amount of energy remaining in the first mobile unit when travelling from the departure point to the start point, a transition of the amount of energy remaining in the first mobile unit when travelling from the start point to the transfer point, and a transition of the amount of energy remaining in the first mobile unit when travelling from the transfer point to the first supply point.

Note that delivery plan generating system 3 may be configured to omit at least one of the following constituent elements: travel-distance acquirer 306, required-time estimator 307, and remaining-energy-amount transition estimator 308.

Destination determiner 304 determines the transfer point where the delivery object is transferred from the first mobile unit to the second mobile unit and the first supply point where the first mobile unit is supplied with energy, as destinations, with reference to the start point, the end point, the positions of the first and second mobile units, the travel distance acquired by travel-distance acquirer 306, the required time estimated by required-time estimator 307, and the transition of the remaining energy amount estimated by remaining-energy-amount transition estimator 308.

Destination determiner 304 may further determine the second supply point where the second mobile unit is supplied with energy as a destination with reference to the start point, the end point, the positions of the first and second mobile units, the travel distance acquired by travel-distance acquirer 306, the required time estimated by required-time estimator 307, and the transition of the remaining energy amount estimated by remaining-energy-amount transition estimator 308. Note that the case where destination determiner 304 also determines the second supply point as a destination is merely one example, and the second supply point does not necessarily have to be determined as a destination.

In the case where delivery plan generating system 3 does not include travel-distance acquirer 306, destination determiner 304 determines destinations without using travel distances acquired by travel-distance acquirer 306.

In the case where delivery plan generating system 3 does not include required-time estimator 307, destination determiner 304 determines destinations without using required times estimated by required-time estimator 307.

In the case where delivery plan generating system 3 does not include remaining-energy-amount transition estimator 308, destination determiner 304 determines destinations without using transitions of remaining energy amounts estimated by remaining-energy-amount transition estimator 308.

While the description of delivery plan generating system 3 according to Embodiment 2 of the present disclosure takes the example of the case where destination determiner 304 also determines the second supply point as a destination, the scope of the contents disclosed in the description of delivery plan generating system 3 according to Embodiment 2 of the present disclosure remains the same even if destination determiner 304 does not determine the second supply point as a destination, and the present disclosure is not limited thereto.

Like destination determiner 104 according to the variation of Embodiment 1, destination determiner 304 may acquire the position of each mobile unit in a mobile unit group and select the first and second mobile units from the mobile unit group with reference to the start point, the end point, and the acquired position of each mobile unit.

Next, the operation of delivery plan generating system 3, i.e., details of the delivery plan generating method executed by delivery plan generating system 3, will be described with reference to FIG. 8.

Figure 8:
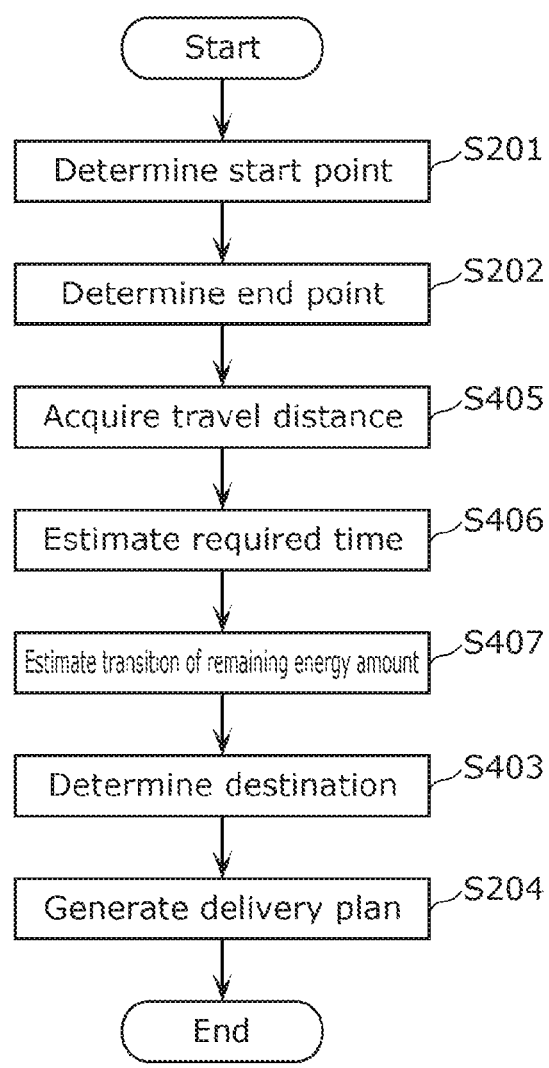
FIG. 8 is a flowchart showing one example of a delivery plan generating method executed by the delivery plan generating system according to Embodiment 2.

FIG. 8 is a flowchart showing one example of the delivery plan generating method executed by delivery plan generating system 3 according to Embodiment 2.

Among constituent elements of delivery plan generating system 3 according to Embodiment 2, those that operate in the same manner as constituent elements of delivery plan generating system 1 according to Embodiment 1 are given the same reference signs, and a description thereof shall be omitted.

The operations performed in steps S201, S202, and S204 are the same as those in Embodiment 1.

Travel-distance acquirer 306 acquires a travel distance of the second mobile unit when travelling to the end point (step S405). In the case where destination determiner 304 also determines the second supply point as a destination, travel-distance acquirer 306 acquires a travel distance of the second mobile unit when travelling to the second supply point. Here, travel-distance acquirer 306 also acquires a travel distance of the first mobile unit when travelling to the first supply point. As the travel route of the first mobile unit, various routes taken by the first mobile unit when travelling to the first supply point are conceivable as candidates. Specifically, various routes from the departure point of the first mobile unit to the start point and various routes from the start point to the transfer point are conceivable. As the travel route of the first mobile unit, various route from the transfer point to the first supply point are also conceivable as candidates. As the travel route of the second mobile unit, various routes taken by the second mobile unit when travelling to the end point are conceivable as candidates. Specifically various routes from the departure point of the second mobile unit to the transfer point and various routes from the transfer point to the end point are conceivable as candidates. In the case where destination determiner 304 also determines the second supply point as a destination, various routes taken by the second mobile unit when travelling to the second supply point are also conceivable as candidates. Specifically various routes from the departure point of the second mobile unit to the transfer point, various routes from the transfer point to the end point, and various routes from the end point to the second supply point are conceivable as candidates. Thus, for example, travel-distance acquirer 306 acquires the travel distance for each candidate for the various routes.

Examples of specific means for travel-distance acquirer 306 to acquire the travel distances of the first and second mobile units include means such as equipping travel-distance acquirer 306 with route information acquisition means for acquiring route information that expresses a road network in graph form, and then using the route information acquired by the route information acquisition means to acquire the travel distances. At this time, for example, travel-distance acquirer 306 may obtain routes between points, the travel distances of which are to be acquired, by known best-first search such as Dijkstra's algorithm using the weight of an edge as a distance of the road expressed by the edge and acquire a total sum of the weights of the edges of obtained routes (specifically, the distances of the roads expressed by the edges) as a travel distance. Alternatively, for example, travel-distance acquirer 306 may include communication means and acquire travel distances acquired by an external system via communication. Note that these are merely examples and not intended to limit the present disclosure.

Required-time estimator 307 estimates the time required for the second mobile unit to travel to the end point (step S406). In the case where destination determiner 304 also determines the second supply point as a destination, required-time estimator 307 estimates the time required for the second mobile unit to travel to the second supply point. Here, required-time estimator 307 also estimates the time required for the first mobile unit to travel to the first supply point. As the travel route of the first mobile unit, various routes taken by the first mobile unit when traveling to the first supply point are conceivable as candidates. Specifically, various routes from the departure point of the first mobile unit to the start point and various routes from the start point to the transfer point are conceivable. As the travel route of the first mobile unit, various routes from the transfer point to the first supply point are also conceivable as candidates. As the travel route of the second mobile unit, various routes taken by the second mobile unit when travelling to the end point are conceivable as candidates. Specifically, various routes from the departure point of the second mobile unit to the transfer point and various routes from the transfer point to the end point are conceivable as candidates. In the case where destination determiner 304 also determines the second supply point as a destination, various routes taken by the second mobile unit when travelling to the second supply point are conceivable as candidates. Specifically, various routes from the departure point of the second mobile unit to the transfer point, various routes from the transfer point to the end point, and various routes from the end point to the second supply point are conceivable as candidates. Accordingly, for example, required-time estimator 307 estimates the required time for each candidate for the various routes.

Examples of specific means for required-time estimator 307 to estimate the time required for the first mobile unit and the time required for the second mobile unit include means such as equipping required-time estimator 307 with route information acquisition means for acquiring route information that expresses a road network in graph form, and then using the route information acquired by the route information acquisition means to estimate the required times. At this time, for example, required-time estimator 307 may obtain routes between points, the required times of which are to be estimated, by known best-first search such as Dijkstra's algorithm using the weight of an edge as an average required time for the road expressed by the edge and estimate a total sum of the weights of the edges of obtained routes (specifically, the average required times for the roads expressed by the edges) as a required time. Alternatively, for example, required-time estimator 307 may include communication means and acquire required times estimated by an external system via communication. Note that these are merely examples and not intended to limit the present disclosure.

Remaining-energy-amount transition estimator 308 estimates a transition of the amount of energy remaining in the second mobile unit when travelling to the end point (step S407). In the case where destination determiner 304 also determines the second supply point as a destination, remaining-energy-amount transition estimator 308 estimates a transition of the amount of energy remaining in the second mobile unit when travelling to the second supply point. Here, remaining-energy-amount transition estimator 308 also estimates a transition of the amount of energy remaining in the first mobile unit when travelling to the first supply point. As the travel route of the first mobile unit, various routes taken by the first mobile unit when travelling to the first supply point are conceivable as candidates. Specifically, various routes from the departure point of the first mobile unit to the start point and various routes from the start point to the transfer point are conceivable. As the travel route of the first mobile unit, varies routes from the transfer point to the first supply point are also conceivable as candidates. As the travel route of the second mobile unit, various routes taken by the second mobile unit when travelling to the end point are conceivable as candidates. Specifically, various routes from the departure point of the second mobile unit to the transfer point and various routes from the transfer point to the end point are conceivable. In the case where destination determiner 304 also determines the second supply point as a destination, various routes taken by the second mobile unit when travelling to the second supply point are conceivable as candidates. Specifically, various routes from the departure point of the second mobile unit to the transfer point, various routes from the transfer point to the end point, and various routes from the end point to the second supply point are conceivable as candidates. Thus, for example, remaining-energy-amount transition estimator 308 estimates a transition of the remaining energy amount for each candidate for the various routes.

Examples of specific means for remaining-energy-amount transition estimator 308 to estimate the transition of the amount of energy remaining in the first mobile unit and the transition of the amount of energy remaining in the second mobile unit include the following means. For example, remaining-energy-amount transition estimator 308 may include storage means and communication means, and each of the first and second mobile units may include remaining-energy-amount measuring means and communication means. Each of the first and second mobile units may measure the remaining amount of energy at regular time intervals via the remaining-energy-amount measuring means and transmit the calculated remaining energy amount to remaining-energy-amount transition estimator 308 via the communication means. Then, remaining-energy-amount transition estimator 308 may receive the amount of energy remaining in the first mobile unit, transmitted from the first mobile unit, and the amount of energy remaining in the second mobile unit, transmitted from the second mobile unit, via the communication means, store the received amounts of energy remaining in the first and second mobile units in the storage means, and estimate subsequent transitions of the remaining energy amounts with reference to the past amounts of energy remaining in the first and second mobile units stored in the storage means.

As specific means for estimating the transitions of the remaining energy amounts with reference to the past remaining energy amounts stored for the first and second mobile units in the storage means, for example in the case of storing the amounts of energy remaining in the first and second mobile units in the storage means, travel distances between remaining-energy-amount measuring points for the first and second mobile units, obtained from the positions of the first and second mobile units, may also be stored in the storage means, and the past remaining energy amounts and the past travel distances stored for each of the first and second mobile units in the storage means may be used to estimate the transitions of the remaining energy amounts. At this time, mathematical approximation such as linear approximation may be used to estimate the transitions of the remaining energy amounts, or a correlation between the travel distance and the transition of the remaining energy amount may be checked in advance and used as a basis to estimate the transitions of the remaining energy amounts. At this time, in the case where delivery plan generating system 3 includes travel-distance acquirer 306, the transitions of the remaining energy amounts may be estimated upon each arrival at each point on the route expected to be traveled, with reference to travel distances between points on the route expected to be traveled, acquired by travel-distance acquirer 306. At this time, travel-distance acquirer 306 may acquire travel distances between points on the route of the delivery plan generated by plan generator 105, and the acquired travel distances may be used as a basis to estimate the transitions of remaining energy amounts upon each arrival at each point on the route of the delivery plan generated by plan generator 105.

As another specific means for estimating the transitions of the remaining energy amounts with reference to the past remaining energy amounts stored for the first and second mobile units in the storage means, for example, remaining-energy-amount transition estimator 308 may further include time acquisition means for acquiring the current time, and in the case of storing the amounts of energy remaining in the first and second mobile units in the storage means, travel times between remaining-energy-amount measuring points for each of the first and second mobile units, obtained from the current time, may also be stored in the storage means, and the past remaining energy amounts and the past travel times stored for each of the first and second mobile units in the storage means may be used as a basis to estimate the transitions of the remaining energy amounts. At this time, mathematical approximation such as linear approximation may be used to estimate the transitions of the remaining energy amounts, or a correlation between the travel time and the transition of the remaining energy amount may be checked in advance and used as a basis to estimate the transitions of the remaining energy amounts. At this time, in the case where delivery plan generating system 3 includes required-time estimator 307, the transitions of the remaining energy amounts may be estimated upon each arrival at each point on the route expected to be traveled, with reference to travel times between points on the route expected to be traveled, acquired by required-time estimator 307. At this time, required-time estimator 307 may acquire travel times between points on the route of the delivery plan generated by plan generator 105, and the acquired travel times may be used as a basis to estimate the transitions of the remaining energy amounts upon each arrival at each point on the route of the delivery plan generated by plan generator 105.

In the case where delivery plan generating system 3 is provided in the first mobile unit or the second mobile unit, remaining-energy-amount transition estimator 308 may acquire remaining energy amounts by measurement using the remaining-energy-amount measuring means without the intervention of the communication means.

Note that these specific means for remaining-energy-amount transition estimator 308 to estimate the transition of the remaining energy amount for each of the first and second mobile units are merely examples and not intended to limit the present disclosure.

Although FIG. 8 is a flowchart in which steps S201, S202, S405, S406, and S407 are sequentially executed in order, steps S201, S202, S405, S406, and S407 do not necessarily have to be sequentially executed in this order, and each step may be executed an arbitrary number of times at an arbitrary time before execution of step S403. For example, each step may be triggered and executed for the first time when execution of step S403 becomes necessary, or may be executed in advance before execution of step S403. In the case where each step is executed in advance before execution of step S403, the step may be executed at regular time intervals or may be triggered and executed by some sort of event. Note that these are merely examples and not intended to limit the present disclosure.

Destination determiner 304 determines the transfer point where the delivery object is transferred from the first mobile unit to the second mobile unit, the first supply point where the first mobile unit is supplied with energy, and the second supply point where the second mobile unit is supplied with energy, as destinations, with reference to the start point, the end point, the positions of the first and second mobile units, the travel distance acquired by travel-distance acquirer 306 (e.g., one or more travel distances among the travel distances acquired for each candidate for various routes as described above), the required time required by required-time estimator 307 (e.g., one or more required times among the required times acquired for each candidate for various routes as described above), and the transition of the remaining energy amount estimated by remaining-energy-amount transition estimator 308 (e.g., one or more transitions of the remaining energy amount(s) among the transitions of the remaining energy amounts acquired for each candidate for various routes as described above).

In the case where destination determiner 304 acquires the position of each mobile unit in a mobile unit group and selects first and second mobile units from the mobile unit group with reference to the start point, the end point, and the acquired position of each mobile unit, destinations are determined based on the start point, the end point, the positions of the first and second mobile units selected from among the mobile units in the mobile unit group, the travel distance acquired by travel-distance acquirer 306, the required time estimated by required-time estimator 307, and the transition of the remaining energy amount estimated by remaining-energy-amount transition estimator 308. Although destination determiner 304 determines destinations after having selected the first and second mobile units from the mobile unit group, the present disclosure is not limited to this example. For example, destination determiner 304 may perform the selection of first and second mobile units and the determination of the destinations at the same time. As another alternative, for example, destination determiner 304 may repeatedly perform the selection of the first and second mobile units and the determination of the destinations so as to optimize ultimately determined destinations.

Examples of specific means for destination determiner 304 to select the first and second mobile units from the mobile unit group include means such as obtaining third and fourth travel distances acquired by travel-distance acquirer 306 for every combination of a candidate for the first mobile unit, i.e., a first candidate mobile unit, and a candidate for the second mobile unit, i.e., a second candidate mobile unit, both belonging to the mobile unit group, and selecting the first and second mobile units with reference to the third and fourth travel distances, the third travel distance being a travel distance of a route from the position of the first candidate mobile unit via the start point and a candidate for the transfer point (e.g., a point in the vicinity of the midpoint between the start point and the end point) to a candidate for the first supply point (e.g., a supply point in the vicinity of the candidate for the transfer point), and the fourth travel distance being a travel distance of a route from the position of the second candidate mobile unit via the candidate for the transfer point and the end point to a candidate for the second supply point (e.g., a supply point in the vicinity of the end point). At this time, for example, destination determiner 304 may select the first and second mobile units so as to minimize a sum of the third and fourth travel distances, or may select the first and second mobile units so as to make the third travel distance and the fourth travel distance equal to each other.

Examples of another specific means for destination determiner 304 to select the first and second mobile units include means such as obtaining third and fourth required times estimated by required-time estimator 307 for every combination of a first candidate mobile unit and a second candidate mobile unit, both belonging to a mobile unit group, and selecting the first and second mobile units with reference to the third and fourth required times, the third required time being the time required for the route from the position of the first candidate mobile unit via the start point and a candidate for the transfer point to the first supply point, and the fourth required time being the time required for the route from the position of the second candidate mobile unit via the candidate for the transfer point and the end point to the second supply point. At this time, for example, destination determiner 304 may select the first and second mobile units so as to minimize a sum of the third and fourth required times, or may select the first and second mobile units so as to make the third required time and the fourth required time equal to each other.

Examples of yet another specific means for destination determiner 304 to select the first and second mobile units include means such as obtaining a third remaining-energy-amount transition and a fourth remaining-energy-amount transition estimated by remaining-energy-amount transition estimator 308 for every combination of the first candidate mobile unit and the second candidate mobile unit, both belonging to a mobile unit group, and selecting the first and second mobile units with reference to the third and fourth remaining-energy-amount transitions, the third remaining-energy-amount transition being the transition of the remaining energy amount when the first candidate mobile unit travels along the route from the position of the first candidate mobile unit via the start point and the candidate for the transfer point to the candidate for the first supply point, and the fourth remaining-energy-amount transition being the transition of the remaining energy amount when the second candidate mobile unit travels along the route from the position of the second candidate mobile unit via the candidate for the transfer point and the end point to the candidate for the second supply point. At this time, for example, destination determiner 304 may select the first and second mobile units so as to ensure that the remaining energy amounts obtained from the third and fourth remaining-energy-amount transitions do not become less than or equal to a predetermined threshold value, or may select the first and second mobile units so as to minimize a sum of a third energy decrement and a fourth energy decrement, the third energy decrement being a reduced amount of energy obtained from the third remaining-energy-amount transition (difference between the initial and final amounts of energy remaining in the first candidate mobile unit during delivery of the delivery object by the first candidate mobile unit), and the fourth energy decrement being a reduced amount of energy obtained from the fourth remaining-energy-amount transition (difference between the initial and final amounts of energy remaining in the second candidate mobile unit during delivery of the delivery object by the second candidate mobile unit), or may select the first and second mobile units so as to make the third energy decrement and the fourth energy decrement equal to each other.

Note that these specific means for destination determiner 304 to select the first and second mobile units are all merely examples and not intended to limit the present disclosure.

Examples of specific means for destination determiner 304 to determine destinations include means such as determining destinations with reference to a first travel distance and a second travel distance, both acquired by travel-distance acquirer 306, the first travel distance being the travel distance of the route from the position of the first mobile unit via the start point and a candidate for the transfer point to a candidate for the first supply point, and the second travel distance being the travel distance of the route from the position of the second mobile unit via the candidate for the transfer point and the end point to a candidate for the second supply point. At this time, destination determiner 304 may determine destinations so as to minimize a sum of the first and second travel distances, or may determine destinations so as to make the first travel distance and the second travel distance equal to each other. Alternatively, for example, destination determiner 304 may further include transfer-candidate-point acquisition means for acquiring one or more transfer candidate points such as distribution points or parking lots, and available-supply-point acquisition means for acquiring one or more available supply points such as charging stations, gas stations, hydrogen stations, charging ports, distribution points where gasoline or hydrogen is available, or arbitrary points where it is possible to bring in charging equipment, gasoline, or hydrogen, and may determine the transfer point from among the one or more transfer candidate points acquired by the transfer-candidate-point acquisition means and determine the first and second supply points from among the one or more available supply points acquired by the available-supply-point acquisition means.

Examples of another specific means for destination determiner 304 to determine destinations include means such as determining destinations with reference to a first required time and a second required time, both acquired by required-time estimator 307, the first required time being the time required for the route from the position of the first mobile unit via the start point and a candidate for the transfer point to a candidate for the first supply point, and the second required time being the time required for the route from the position of the second mobile unit via the candidate for the transfer point and the end point to a candidate for the second supply point. A this time, destination determiner 304 may determine destinations so as to minimize a sum of the first required time and the second required time, or may determine destinations so as to make the first required time and the second required time equal to each other. Alternatively, for example, destination determiner 304 may further include transfer-candidate-point acquisition means for acquiring one or more transfer candidate points such as distribution points or parking lots, and available-supply-point acquisition means for acquiring one or more available supply points such as charging stations, gas stations, hydrogen stations, charging ports, distribution points where gasoline or hydrogen is available, or arbitrary points where it is possible to bring in charging equipment, gasoline, or hydrogen, and may determine a transfer point from among one or more transfer candidate points acquired by transfer-candidate-point acquisition means, and may determine the transfer point from among the one or more transfer candidate points acquired by the transfer-candidate-point acquisition means and determine the first and second supply points from among the one or more available supply points acquired by the available-supply-point acquisition means.

As another alternative, destination determiner 304 may determine destinations so as to ensure that the amounts of energy remaining in the first and second mobile units when the execution of the delivery plan generated by plan generator 105 is completed, which is obtained from the transitions of the remaining energy amounts estimated by remaining-energy-amount transition estimator 308, do not become less than or equal to a predetermined threshold value. The predetermined threshold value is, for example, such a remaining energy amount that makes the mobile units incapable of travelling. That is, destination determiner 304 may determine destinations so as to prevent the first and second mobile units from running out of energy and thereby becoming incapable of travelling at the time of completion of the execution of the delivery plan. Specifically, destination determiner 304 may determine destinations with reference to one or more of the amounts of energy remaining in the second mobile unit when the second mobile unit has arrived at the end point and at each candidate point for destinations (specifically, the candidate for the transfer point and the candidate for the second supply point), obtained from the transition of the remaining energy amount estimated by remaining-energy-amount transition estimator 308. This is because whether the amount of energy ultimately remaining in the second mobile unit when having completed the execution of the delivery plan is less than or equal to a predetermined threshold value can be estimated from the amount of energy remaining in the second mobile unit when located at a specific point. As in the case of the second mobile unit, destination determiner 304 may also determine destinations with reference to one or more of the amounts of energy remaining in the first mobile unit when the first mobile unit is has arrived at the start point and each candidate point for destination (specifically, the candidate for the transfer point or the candidate for the first supply point), obtained from the transition of the remaining energy amount estimated by remaining-energy-amount transition estimator 308.

Examples of yet another specific means for destination determiner 304 to determine destinations include means such as determining destinations with reference to a first remaining-energy-amount transition and a second remaining-energy-amount transition, both estimated by remaining-energy-amount transition estimator 308, the first remaining-energy-amount transition being the transition of the remaining energy amount when the first mobile unit travels along the route from the position of the first mobile unit via the start point and a candidate for the transfer point to the first supply point, and the second remaining-energy-amount transition being the transition of the remaining energy amount when the second mobile unit travels along the route from the position of the second mobile unit via the candidate for the transfer point and the end point to a candidate for the second supply point. At this time, for example, destination determiner 304 may determine destinations so as to ensure that the remaining energy amounts obtained from the first remaining-energy-amount transition and the second remaining-energy-amount transition do not become less than or equal to a predetermined threshold value, or may determine destinations so as to minimize a sum of a first energy decrement and a second energy decrement, the first energy decrement being the reduced amount of energy obtained from the first remaining-energy-amount transition (difference between the initial and final amounts of energy remaining in the first mobile unit during delivery of the delivery object by the first mobile unit), and the second energy decrement being the reduce amount of energy obtained from the second remaining-energy-amount transition (difference between the initial and final amounts of energy remaining in the second mobile unit during delivery of the delivery object by the second mobile unit), or may determine destinations so as to make the first energy decrement and the second energy decrement equal to each other. As another alternative, for example, destination determiner 304 may further include transfer-candidate-point acquisition means for acquiring one or more transfer candidate points such as distribution points or parking lots, and available-supply-point acquisition means for acquiring one or more available supply points such as charging stations, gas stations, hydrogen stations, charging ports, distribution points where gasoline or hydrogen is available, or arbitrary points where it is possible to bring in charging equipment, gasoline, or hydrogen, and may determine the transfer point from among the one or more transfer candidate points acquired by the transfer-candidate-point acquisition means and determine the first and second supply points from among the one or more available supply points acquired by the available-supply-point acquisition means.

In this way, the candidate for the transfer point, the candidate for the first supply point, and the candidate for the second supply point that match predetermined conditions relating to, for example, the travel distance, the required time, the transition of the remaining energy amount, and the supply points are determined as destinations. As described above, examples of the predetermined conditions include a condition that shortens the travel distance, a condition that shortens the required time, a condition that reduces energy consumption, and a condition that provides a place allowing energy supply.

These specific means for destination determiner 304 to determine destinations are all merely examples and not intended to limit the present disclosure.

Although FIG. 8 is a flowchart in which steps S403 and S204 are sequentially executed in order, steps S403 and S204 do not necessarily have to be sequentially executed in this order.

For example, steps S403 and S204 may be repeatedly executed until a certain criterion is satisfied. In this case, for example, an evaluation function for evaluating the delivery plan generated in step S204 may be defined in advance, and if an evaluation value obtained by evaluating the delivery plan generated in step S204 with reference to the evaluation function is less than a predetermined threshold value, destination determiner 304 may execute step S403 again to re-determine the destinations, and plan generator 105 may re-generate the delivery plan by executing step S204 again with reference to the re-determined destinations.

As another alternative, for example, the processing in step S403 and the processing in step S204 may be integrated and executed together. In this case, for example, plan generator 105 may invoke the processing for determining destinations in step S403 during execution of the processing for generating the delivery plan in step S204, or may divide each of the processing in step S403 and the processing in S204 into several sub-processes and invoke each sub-process based on the divisions of the processing.

Note that these specific examples relating to the execution sequence of steps S403 and S204 are merely examples and not intended to limit the present disclosure.

Each processing in the delivery plan generating method may be started at an arbitrary point during operation of the first and second mobile units or during operation of each mobile unit in the mobile unit group. For example, before departure of the first and second mobile units or each mobile unit in the mobile unit group, the delivery plan generating system may complete the execution of each processing in the delivery plan generating method, and determine in advance a delivery plan involving transfer of a delivery object, and then cause the first and second mobile units to execute this delivery plan. As another alternative, while the first and second mobile units or each mobile unit in the mobile unit group is executing a delivery plan that does not take into consideration the transfer of a delivery object or is travelling without using any delivery plan, delivery plan generating system 3 may start the execution of each processing in the delivery plan generating method and cause the first and second mobile units to execute the generated delivery plan that involves the transfer of a delivery object. In this case, each processing in the delivery plan generating method may be triggered and executed when the amount of energy remaining in the first mobile unit becomes less than or equal to a predetermined threshold value.

Note that these specific examples relating to the timing of execution of each processing in the delivery plan generating method are merely examples and not intended to limit the present disclosure.

As described above, according to Embodiment 2, it is possible to transfer a delivery object to another mobile unit and complete the delivery efficiently from the viewpoint of the travel distance, the required time, or energy consumption. For example, from the viewpoint of energy consumption, it is possible to improve the efficiency of energy consumption while reducing the possibility that the delivery of a delivery object will end in failure due to depletion of moving energy of the mobile unit. Moreover, it is possible to more reliably avoid a situation where the first mobile unit runs out of energy before completion of the transfer and to more reliably avoid a situation where the second mobile unit runs out of energy before completion of the delivery. That is, this further reduces the possibility that the delivery of a delivery object will end in failure due to depletion of moving energy of the mobile unit. Besides, it is also possible to more reliably avoid a situation where the second mobile unit runs out of energy after completion of the delivery and to more reliably avoid a situation where the first mobile unit runs out of energy after completion of the transfer. For example, from the viewpoint of the travel distance, it is possible to reduce the travel distance while reducing the possibility that the delivery of a delivery object will end in failure due to depletion of moving energy of the mobile unit. From the viewpoint of the required time, for example, it is possible to shorten the required time while reducing the possibility that the delivery of a delivery object will end in failure due to depletion of moving energy of the mobile unit.

Other Embodiments

While the delivery plan generating system and the delivery plan generating method according to one or a plurality of aspects of the present disclosure have been described thus far with reference to the embodiments, the present disclosure is not limited to these embodiments. Modes such as those obtained by making various modifications conceivable by those skilled in the art to each embodiment and those constituted by any combination of constituent elements described in different embodiments may also be included in the scope of one or a plurality of aspects of the present disclosure, without departing from the gist of the present disclosure.

For example, although the first supply point is determined as a destination in the description of the above embodiments, the first supply point does not necessarily have to be determined as a destination. Although the delivery plan for causing the first mobile unit to travel via the start point and the transfer point in order to the first supply point is generated according to the above description, such a delivery plan for causing the first mobile unit to travel up to the first supply point does not necessarily have to be generated. That is, only the transfer point may be determined as a destination of the first mobile unit so as to generate a delivery plan for causing the first mobile unit to travel via the start point to the transfer point, and a delivery plan for a subsequent route of the first mobile unit after the transfer point does not necessarily have to be generated.

For example, the delivery plan generating system may be a computer such as a server. Constituent elements of the delivery plan generating system may be arranged in a plurality of dispersed computers.

For example, steps in the delivery plan generating method may be executed by a computer (computer system). For example, a device (e.g., a server device) capable of communication with the first and second mobile units may execute the steps in the delivery plan generating method. Then, the present disclosure can be implemented as a program for causing a computer to execute the steps included in the delivery plan generating method. The present disclosure may also be implemented as a non-transitory computer-readable recording medium such as a CD-ROM that records the program.

For example in the case where the present disclosure is implemented as a program (software), each step may be executed by executing the program via hardware resources such as a CPU, memories, and input/output devices of the computer. That is, each step may be executed by, for example, the CPU acquiring and computing data received from the memories or the input/output circuits or outputting computation results to the memories or the input/output circuits.

According to the present disclosure, all or some of units, devices, systems, members, and parts or all or some of the functional blocks illustrated in the block diagrams may be executed by one or a plurality of electronic circuits including a semiconductor device, a semiconductor integrated circuit (IC), or a large-scale integrated circuit (LSI). The LSI or the IC may be integrated on a single chip or may be configured by a combination of a plurality of chips. For example, functional blocks other than memory elements may be integrated on a single chip. Here, the LSI or the IC as used herein may be named differently depending on the degree of integration and may also be referred to as a system LSI, a very large-scale integrated circuit (VLSI), or an ultra-large-scale integrated circuit (ULSI). A field programmable gate array (FPGA) that is programmed after manufacture of the LSI or a reconfigurable logic device capable of setting up circuit sections inside the LSI may also be used for the same purpose.

All or some functions and operations of the units, devices, members, and parts may be executed by software processing. In this case, software is recorded on one or a plurality of non-transitory recording media such as ROMs, optical disks, or hard disk drives, and when the software is executed by a processor, functions specified by the software are executed by the processor and peripheral equipment. Systems or devices may include one or a plurality of non-transitory recording media in which software is recorded, a processor, and any necessary hardware device such as an interface.

INDUSTRIAL APPLICABILITY

The delivery plan generating system according to the present disclosure is applicable to a system for use in long-distance delivery of delivery objects such as parcels or passengers.

The invention claimed is:

1. A travel plan generating method to be executed by a computer, the computer including a non-transitory memory configured to store one or more programs and a controller configured to execute the one or more programs to perform the travel plan generating method, comprising:
   determining a start point including displaying a map on a touch screen and receiving an input, the start point being a point where a first mobile vehicle is located;
   determining an end point including displaying the map on the touch screen and receiving an input, the end point being a destination end-point of the first mobile vehicle or a second mobile vehicle;
   estimating a transition of an amount of remaining energy in the second mobile vehicle when travelling to the end point based on remaining energy information received from the second mobile vehicle;
   determining a contact point as a destination with reference to the start point, the end point, a position of the first mobile vehicle based on GPS coordinates received from the first mobile vehicle, a position of the second mobile vehicle based on GPS coordinates received from the second mobile vehicle, and the remaining energy in the second mobile vehicle, the contact point being a point where the first mobile vehicle contacts the second mobile vehicle; and
   generating a plan for causing the first mobile vehicle to travel from the start point to the contact point determined and causing the second mobile vehicle to travel from the contact point determined to the end point.

2. The travel plan generating method according to claim 1,
   wherein, in the determining of the destination, the destination is determined to ensure that the amount of remaining energy in the second mobile vehicle when execution of the travel plan generated is completed, which is obtained from the transition of the amount of remaining energy estimated, does not become less than or equal to a predetermined threshold value.

3. The travel plan generating method according to claim 2,
wherein, in the determining of the destination, the destination is determined with reference to one or more amounts of remaining energy in the second mobile vehicle, obtained from the transition of the amount of remaining energy estimated, out of the amount of remaining energy in the second mobile vehicle located at the end point and the amount of remaining energy in the second mobile vehicle that has arrived at each point of candidates for the destination.

4. The travel plan generating method according to claim 1,
wherein, in the determining of the destination, a first supply point where the first mobile vehicle is supplied with energy is further determined as a destination, and
in the generating, a plan is generated for causing the first mobile vehicle to travel from the start point to the first supply point determined via the contact point determined and causing the second mobile vehicle to travel from the contact point determined to the end point.

5. The travel plan generating method according to claim 4,
wherein, in the determining of the destination, the contact point, the first supply point, and a second supply point where the second mobile vehicle is supplied with energy are each determined as the destination with reference to the start point, the end point, and the position of the second mobile vehicle, and
in the generating, a plan is generated for causing the first mobile vehicle to travel from the start point to the first supply point determined via the contact point determined and causing the second mobile vehicle to travel from the contact point determined to the second supply point determined via the end point.

6. The travel plan generating method according to claim 1,
further comprising:
acquiring a travel distance of the second mobile vehicle when travelling to the end point,
wherein, in the determining of the destination, the destination is determined with reference to the travel distance acquired.

7. The travel plan generating method according to claim 1,
further comprising:
estimating a time required for the second mobile vehicle to travel to the end point,
wherein, in the determining of the destination, the destination is determined with reference to the time required that has been estimated.

8. The travel plan generating method according to claim 1,
wherein the determining of the destination includes:
acquiring a position of each mobile vehicle in a mobile vehicle group; and
selecting the first mobile vehicle and the second mobile vehicle from the mobile vehicle group with reference to the start point, the end point, and the position of each mobile vehicle acquired.

9. A travel plan generating system, comprising:
a non-transitory memory configured to store one or more programs; and
a controller configured to execute the one or more programs to:
determine a start point including displaying a map on a touch screen and receiving an input, the start point being a point where a first mobile vehicle is located;
determine an end point including displaying the map on the touch screen and receiving an input, the end point being a destination end-point of the first mobile vehicle or a second mobile vehicle;
estimate a transition of an amount of remaining energy in the second mobile vehicle when travelling to the end point based on remaining energy information received from the second mobile vehicle;
determine a contact point as a destination with reference to the start point, the end point, a position of the first mobile vehicle based on the GPS coordinates received from the first mobile vehicle, a position of the second mobile vehicle based on the GPS coordinates received from the second mobile vehicle, and the remaining energy in the second mobile vehicle, the contact point being a point where the first mobile vehicle contacts the second mobile vehicle; and
generate a plan for causing the first mobile vehicle to travel from the start point to the contact point determined and causing the second mobile vehicle to travel from the contact point determined to the end point.

* * * * *